United States Patent
Steiner, III et al.

(10) Patent No.: US 12,146,031 B2
(45) Date of Patent: Nov. 19, 2024

(54) HYDROPHOBIC POLYIMIDE AEROGELS

(71) Applicant: Aerogel Technologies, LLC, Boston, MA (US)

(72) Inventors: Stephen A. Steiner, III, Milwaukee, WI (US); Ryan T. Nelson, Fort Collins, CO (US); Moriah C. Buckwalter, South Weymouth, MA (US); Justin S. Griffin, Watertown, MA (US)

(73) Assignee: Aerogel Technologies, LLC, Boston, MA (US)

( * ) Notice: Subject to any disclaimer, the term of this patent is extended or adjusted under 35 U.S.C. 154(b) by 170 days.

(21) Appl. No.: 17/767,980

(22) PCT Filed: Oct. 9, 2020

(86) PCT No.: PCT/US2020/055036
§ 371 (c)(1),
(2) Date: Apr. 11, 2022

(87) PCT Pub. No.: WO2021/072234
PCT Pub. Date: Apr. 15, 2021

(65) Prior Publication Data
US 2022/0363829 A1    Nov. 17, 2022

Related U.S. Application Data

(60) Provisional application No. 62/914,281, filed on Oct. 11, 2019.

(51) Int. Cl.
*C08G 73/10* (2006.01)
*A43B 1/14* (2006.01)
(Continued)

(52) U.S. Cl.
CPC ............ *C08G 73/1042* (2013.01); *A43B 1/14* (2013.01); *B64C 1/12* (2013.01); *C01B 32/05* (2017.08);
(Continued)

(58) Field of Classification Search
CPC ......... C08G 73/1042; C08G 2110/0091; C08J 2205/026
See application file for complete search history.

(56) References Cited

U.S. PATENT DOCUMENTS 7,780,890 B2    8/2010  Lee et al.
8,974,903 B2    3/2015  Meador et al.
(Continued)

FOREIGN PATENT DOCUMENTS

CN    108348871 A    7/2018
CN    108699277 A    10/2018
(Continued)

OTHER PUBLICATIONS

Invitation to Pay Additional Fees for International Application No. PCT/US2020/055036 mailed Dec. 9, 2020.
(Continued)

*Primary Examiner* — Jasper Saberi
(74) *Attorney, Agent, or Firm* — Wolf, Greenfield & Sacks, P.C.

(57) ABSTRACT

Aerogels comprising a hydrophobic polyimide moiety, including hydrophobic polyimide aerogels, as well as methods of manufacture and applications thereof, are generally described.

41 Claims, 8 Drawing Sheets

(51) Int. Cl.
| | |
|---|---|
| B64C 1/12 | (2006.01) |
| C01B 32/05 | (2017.01) |
| C08K 7/26 | (2006.01) |
| C09J 7/26 | (2018.01) |
| F02B 77/00 | (2006.01) |
| F41H 5/02 | (2006.01) |

(52) U.S. Cl.
CPC ............ *C08G 73/1071* (2013.01); *C08K 7/26* (2013.01); *C09J 7/26* (2018.01); *F02B 77/00* (2013.01); *C08G 2110/005* (2021.01); *C08G 2110/0091* (2021.01); *C08J 2205/026* (2013.01); *C08J 2205/044* (2013.01); *C08J 2205/048* (2013.01); *C08J 2379/08* (2013.01); *C09J 2479/086* (2013.01); *F41H 5/02* (2013.01)

(56) References Cited

U.S. PATENT DOCUMENTS

| 9,309,369 | B1 | 4/2016 | Meador |
|---|---|---|---|
| 9,434,832 | B1 | 9/2016 | Meador |
| 9,512,287 | B2 | 12/2016 | Rhine et al. |
| 9,593,206 | B2 | 3/2017 | White et al. |
| 9,963,571 | B2 | 5/2018 | Sakaguchi et al. |
| 10,287,411 | B2 | 5/2019 | Poe et al. |
| 10,358,539 | B1 | 7/2019 | Meador |
| 10,723,857 | B1 * | 7/2020 | Viggiano ........... C08G 73/1067 |
| 2007/0259979 | A1 | 11/2007 | Lee |
| 2009/0029147 | A1 * | 1/2009 | Tang ................... C08J 9/0066 |
| | | | 521/142 |
| 2014/0134907 | A1 | 5/2014 | Kissell et al. |
| 2014/0350134 | A1 | 11/2014 | Rodman et al. |
| 2015/0141544 | A1 * | 5/2015 | Meador ............... C08G 73/106 |
| | | | 521/183 |
| 2016/0032073 | A1 | 2/2016 | Nguyen et al. |
| 2016/0133354 | A1 * | 5/2016 | Cunningham ........... H01B 7/28 |
| | | | 385/100 |
| 2018/0021739 | A1 | 1/2018 | Sugawara et al. |
| 2018/0112054 | A1 * | 4/2018 | Steiner, III ........... C08G 18/092 |
| 2019/0058178 | A1 | 2/2019 | Meador et al. |

FOREIGN PATENT DOCUMENTS

| JP | 2017-145344 | 8/2017 |
|---|---|---|
| WO | WO 2016/054524 A2 | 4/2016 |
| WO | WO 2016/195692 A1 | 12/2016 |
| WO | WO 2021/072323 A1 | 4/2021 |

OTHER PUBLICATIONS

International Search Report and Written Opinion for International Application No. PCT/US2020/055036 mailed Feb. 19, 2021.
International Preliminary Report on Patentability (Chapter 1) for International Application No. PCT/US2020/055036 mailed Apr. 21, 2022.
Meador et al., Structure—Property Relationships in Porous 3D Nanostructures as a Function of Preparation Conditions: Isocyanate Cross-Linked Silica Aerogels. Chem Mater. Apr. 3, 2007;19(9):2247-60.
Zhang et al., Multifunctional, marvelous polyimide aerogels as highly efficient and recyclable sorbents. RSC Adv. Jan. 15, 2015;5(17):12592-6.
Office Action for EP Application No. 20875362.4 dated Jul. 10, 2023.
Extended European Search Report for EP Application No. 20875362.4 dated Oct. 12, 2023.
Office Action for CN Application No. 20280070386.7 dated Mar. 18, 2024.
Meador et al., Polyimide aerogels with amide cross-links: a low cost alternative for mechanically strong polymer aerogels. ACS Appl Mater Interfaces. Jan. 21, 2015;7(2):1240-9. doi: 10.1021/am507268c. Epub Jan. 7, 2015.

\* cited by examiner

BisM+DMBZ+ODA/BPDA, 10wt%, TAB

HYDROPHOBIC POLYIMIDE AEROGELS

RELATED APPLICATIONS

This application is a national stage filing under 35 U.S.C. § 371 of International Patent Application No. PCT/US2020/055036, filed Oct. 9, 2020, and entitled "Hydrophobic Polyimide Aerogels," which claims priority under 35 U.S.C. § 119 (e) to U.S. Provisional Application No. 62/914,281, filed Oct. 11, 2019, and entitled "Hydrophobic Polyimide Aerogels," each of which is incorporated herein by reference in its entirety for all purposes.

TECHNICAL FIELD

Aerogels comprising a hydrophobic polyimide moiety, including hydrophobic polyimide aerogels, as well as methods of manufacture and applications thereof, are generally described.

SUMMARY

Aerogels comprising a hydrophobic polyimide moiety, including hydrophobic polyimide aerogels, as well as methods of manufacture and applications thereof, are generally described. The subject matter of the present invention involves, in some cases, interrelated products, alternative solutions to a particular problem, and/or a plurality of different uses of one or more systems and/or articles.

Certain embodiments relate to polyimide aerogels with water-resistant properties. In some embodiments, the aerogel comprises a reaction product of bisaniline-m.

Certain embodiments are related to porous crosslinked polyimide networks. In some embodiments, the porous crosslinked polyimide network comprises an anhydride end-capped poly(amic acid) oligomer, wherein the oligomer (i) comprises a repeating unit of a dianhydride and a diamine and terminal anhydride groups, (ii) has an average degree of polymerization of 10 to 50, (iii) has been crosslinked via a crosslinking agent that comprises three or more functional groups at an approximately balanced stoichiometry of the functional groups to the terminal anhydride groups, and (iv) has been chemically and/or thermally imidized to yield the porous crosslinked polyimide network.

In one aspect, an aerogel is provided. In some embodiments, the aerogel comprises the following moiety [M1]:

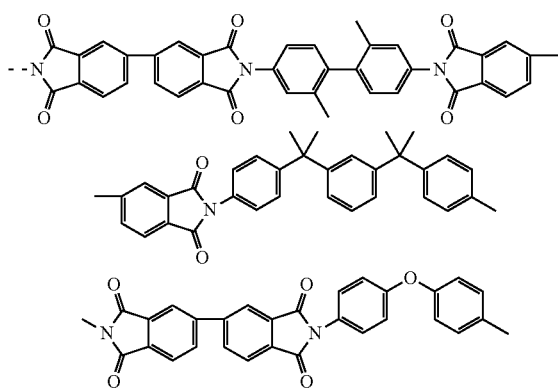

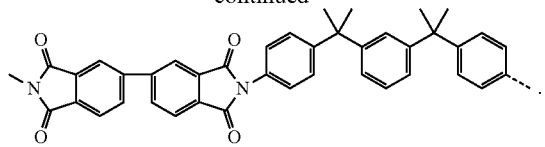

Certain aspects are related to methods. In certain embodiments, the method comprises combining an amount of biphenyl-3,3',4,4'-tetracarboxylic dianhydride (BPDA), a first diamine, and a solvent such that a first intermediate medium comprising anhydride-capped poly(amic acid) trimer is formed; subsequently, combining the first intermediate medium and a second diamine such that a second intermediate medium comprising pentamer is formed; subsequently, combining the second intermediate medium and an additional amount of BPDA such that a third intermediate medium comprising heptamer is formed; subsequently, combining the third intermediate medium and a third diamine such that a fourth intermediate medium comprising oligomer chains is formed; and subsequently, combining the fourth intermediate medium and a crosslinking reagent to form a gel, wherein the first diamine is different from the second diamine and the third diamine, and the second diamine is different from the third diamine.

In some embodiments, a method for making an aerogel comprises providing a solvent, adding a first diamine to the solvent, adding a first amount of a dianhydride to the solvent after adding the first diamine, adding a second diamine to the solvent after adding the first amount of dianhydride, adding a second amount of a dianhydride to the solvent after adding the second diamine, adding a third diamine to the solvent after adding the second amount of dianhydride, adding a crosslinker to the solvent, adding a catalyst to the solvent, and adding a water scavenger to the solvent to form a gel comprising poly(amic acid) and/or polyimide, optionally replacing at least a portion of the liquid in the resulting gel with a second liquid, and then removing at least a portion of the liquid from the gel to form an aerogel.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the drawings.

DETAILED DESCRIPTION

Figure 1A:
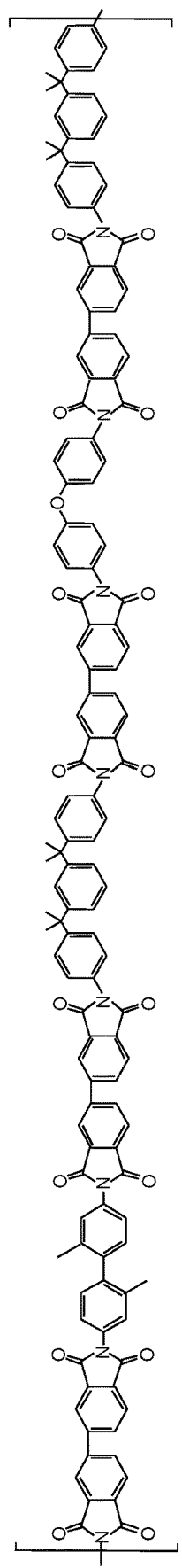
FIG. 1A depicts a hydrophobic polyimide moiety, according to certain embodiments.

Aerogels are a diverse class of low-density solid materials comprised of a porous three-dimensional solid-phase network. Aerogels often exhibit a wide array of desirable materials properties including high specific surface area, low bulk density, high specific strength and stiffness, low thermal conductivity, and/or low dielectric constant, among others.

Certain aerogel compositions may combine several such properties into the same material envelope and may thus be advantageous for applications including thermal insulation, acoustic insulation, lightweight structures, electronics, impact damping, electrodes, catalysts and/or catalyst supports, and/or sensors. Some aerogel materials also possess mechanical properties that make them suitable for use as structural materials and, for example, can be used as lightweight alternatives to plastics.

Aerogels comprising polyimides can potentially combine numerous valuable materials properties into a single material envelope, for example high mass-normalized strength and stiffness properties, low density, low and constant dielectric constant and loss tangent over wide frequency range, low speed of sound, high sound transmission loss, low flammability or nonflammability, machinability, and low thermal conductivity. Potential applications of aerogels comprising polyimides include aircraft interior parts, e.g., wall panels, floor boards, cockpit doors, and galley furnishings; engine covers for automobiles; shockwave-reflecting and/or energy-absorbing materials in ballistics shields; insulative components for shoes, boots, and insoles; vibration and acoustic insulation for rocket fairings; low-k substrates for electronics and antennas; and other applications. Most commercial polyimide materials, e.g., thin films and bulk plastics, traditionally comprise hydrophilic polymers, i.e., they absorb and retain moisture and/or liquid water. Accordingly, most aerogels comprising polyimides are likewise hydrophilic. Many potential engineering applications for polyimide aerogels, however, require materials that can resist contact with liquid-phase and/or vapor-phase water without degrading, gaining significant weight, or losing performance. Thus, aerogels that comprise polyimides that simultaneously exhibit water-resistant properties are highly desirable for many applications.

Certain embodiments are directed to inventive aerogels. In some embodiments, the aerogel comprises a polymer aerogel. A polymer aerogel is an aerogel that is at least partially made out of polymeric material. In some embodiments, at least 25 wt %, at least 50 wt %, at least 75 wt %, at least 90 wt %, at least 95 wt %, at least 98 wt %, at least 99 wt %, at least 99.9 wt %, or all of the polymer aerogel is made of polymeric material. In some embodiments, at least 25 wt %, at least 50 wt %, at least 75 wt %, at least 90 wt %, at least 95 wt %, at least 98 wt %, at least 99 wt %, at least 99.9 wt %, or all of the polymer aerogel is made of organic polymer, i.e., a polymer having carbon atoms in its backbone.

Figure 1B:
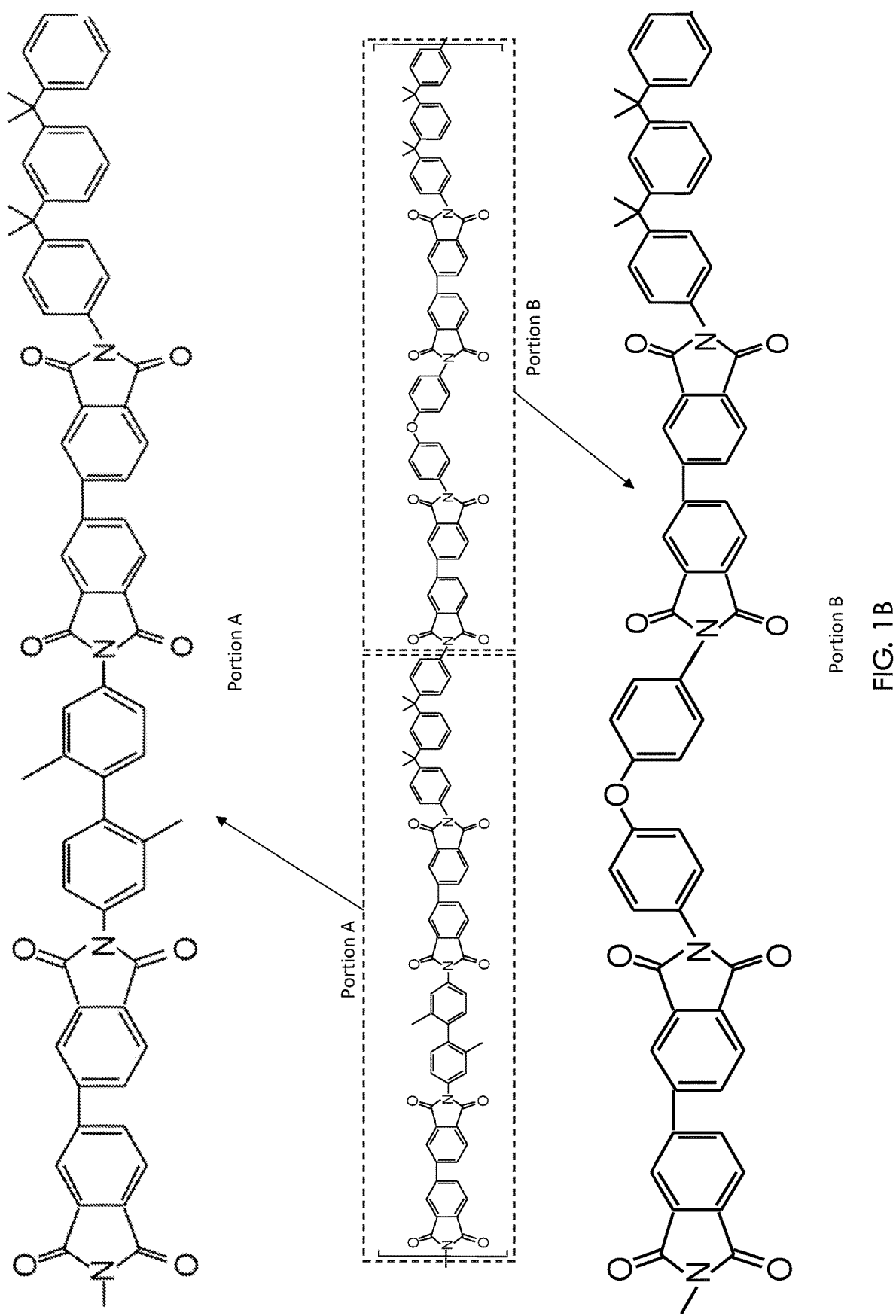
FIG. 1B depicts magnified views of the hydrophobic polyimide moiety shown in FIG. 1A, in accordance with certain embodiments. The left-hand side of the moiety in FIG. 1A is shown in magnified view at the top of FIG. 1B, and the right-hand side of the moiety in FIG. 1A is shown in magnified view at the bottom of FIG. 1B.

In some embodiments, the polymeric material has a polymeric structure. In some embodiments a moiety [M1] (examples of which are provided below, and one specific example of which is shown in FIGS. 1A-1B) is part of a polymeric structure comprising repeating units of the moiety [M1]. In some embodiments the polymeric structure comprises at least 2, at least 3, at least 4, at least 5, at least 10, at least 15, at least 20, at least 30, at least 40, and/or at least 50 repeating units of the moiety [M1]. In some preferred embodiments, the aerogel comprises from 2 to 20 repeating units of the moiety [M1]. Moiety [M1] can make up, in some cases, at least 50 wt %, at least 60 wt %, at least 70 wt %, at least 80 wt %, at least 90 wt %, at least 95 wt %, and/or at least 99 wt % of the polymer in the aerogel.

In some embodiments, at least 50 wt %, at least 60 wt %, at least 70 wt %, at least 80 wt %, at least 90 wt %, at least 95 wt %, and/or at least 99 wt % of the aerogel is made up of material comprising moiety [M1]. In some preferred embodiments, at least 90 wt % of the aerogel is made up from the moiety [M1].

In some embodiments, the aerogel comprises a polyimide aerogel. A polyimide aerogel is an aerogel that is at least partially made out of a polyimide material. In some embodiments, at least 25 wt %, at least 50 wt %, at least 75 wt %, at least 90 wt %, at least 95 wt %, at least 98 wt %, at least 99 wt %, at least 99.9 wt %, or all of the polymer aerogel is made of polyimide. In some embodiments, polyimide aerogels may exhibit one or more materials properties of particular value to engineering applications.

Hydrophobic polyimides have been previously produced, but contain fluorine-containing monomers that are expensive and can degrade other materials properties of the polymer. Likewise, polyimide aerogels comprising such fluorinated monomers have been developed and, while in some cases provide improved water-resistant properties over non-fluorine-containing polyimide aerogels, may exhibit reduced strength and/or stiffness properties and/or higher thermal conductivity values, which is not ideal for applications where the high mass-normalized strength/stiffness and/or low thermal conductivity properties of aerogels is desirable. In accordance with certain embodiments, a hydrophobic polyimide moiety that does not contain any fluorine is provided. In some embodiments, the aerogel comprises less than 1 wt %, less than 0.5 wt %, less than 0.1 wt %, less than 0.01 wt %, and/or less than 0.01 wt % fluorine. In some embodiments, the aerogel is substantially free of fluorine.

In accordance with certain embodiments, a hydrophobic polyimide moiety that does not contain any fluorine is provided. In some embodiments, aerogels comprising this moiety exhibit improved resistance to liquid water uptake and/or vapor-phase water uptake over aerogels comprising polyimides that do not comprise this moiety. In some preferred embodiments, polyimide aerogels in which greater than about 80% of the polyimide comprises this moiety exhibit particularly excellent resistance to water uptake and a high degree of hydrophobicity.

In accordance with certain embodiments, methods for making said moiety as well as methods for making polyimide aerogels comprising said moiety are described.

As noted elsewhere, moiety [M1] corresponds to the following structure:

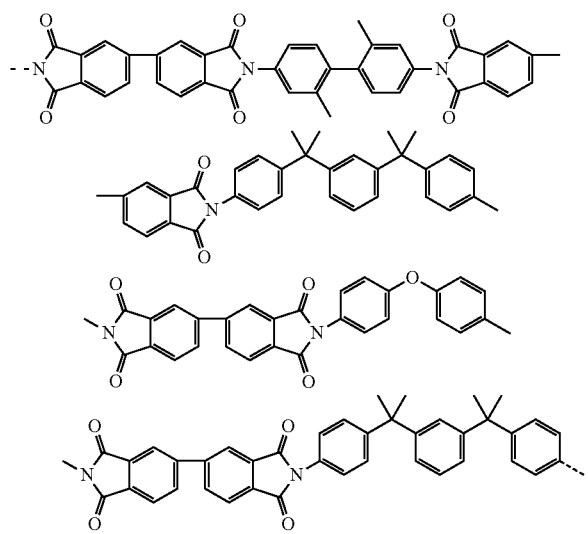

In some preferred embodiments, the moiety comprises a specific repeating octamer of the reaction product of four monomers, with the following sequence, appreciating that an imide group replaces amine and anhydrides from the monomers accordingly: biphenyl-3,3',4,4'-tetracarboxylic dianhydride (BPDA), then 2,2'-dimethylbenzidine (DMBZ), then BPDA, then 4,4'-[1,3-phenylenebis(1-methyl-ethylidene)]bisaniline (bisaniline-m), then BPDA, then 4,4'-oxydianiline (ODA), then BPDA, then bisaniline-m. In some preferred embodiments, polyimide aerogels comprising this moiety exhibit excellent strength, stiffness, flexibility, machinability, low thermal conductivity, low flammability, and high water-resistance properties. In some preferred embodiments, polyimide aerogels comprising polyimide chains that comprise repeating segments of this moiety wherein the moiety repeats 1 time, 2 times, 3 times, 4 times, 5 times, or more than 5 times. In some preferred embodiments, polyimide chains comprising this moiety are connected to each other by a crosslinker. In some preferred embodiments, the pattern of specifically alternating constituent monomers from which the moiety is derived gives rise to the hydrophobic and/or water-resistant properties of the polyimide aerogel. Without wishing to be bound to any particular theory, this moiety may impart enhanced water-resistance properties to polyimide aerogels because of its high density of aryl, isopropylidene, and methyl groups, which are all hydrophobic groups, to counteract hydrophilicity inherent to the imide group. Without wishing to be bound by any particular theory, the inclusion of one unit of ODA, which comprises a flexible oxygen bridge, may impart flexibility into the moiety that provides for a polyimide aerogel with reduced fragility compared to a moiety that does not comprise a flexible oxygen bridge.

In some embodiments, an aerogel comprises the moiety [M1].

In some embodiments, the aerogel comprising the moiety [M1] may exhibit hydrophobicity. The term hydrophobicity refers to the absence and/or partial absence of attractive force between a material and a mass of water. In some embodiments, the hydrophobicity of a bulk material refers to this behavior as it applies to a surface. In certain embodiments, the apparent hydrophobicity of a textured surface can be higher than the chemical hydrophobicity of the bulk material.

Hydrophobicity of the resulting aerogel can be expressed in terms of the liquid water uptake. The term liquid water uptake refers to the ability of a material or composition to absorb, adsorb, or otherwise retain water due to contact with water in the liquid state. Liquid water uptake can be expressed one of several ways, for example, as a fraction or percent of the open pore volume or envelope volume of the aerogel, or as a fraction or percent relative to the mass of the unwetted aerogel. The liquid water uptake reported is understood to be a measurement undertaken under specific conditions. An aerogel material that has superior or improved liquid water uptake relative to a different aerogel material is understood to have a lower uptake of liquid water.

In some embodiments, the liquid water uptake may be less than 100 wt %, less than 80 wt %, less than 70 wt %, less than 60 wt %, less than 50 wt %, less than 40 wt %, less than 30 wt %, less than 20 wt %, less than 10 wt %, less than 5 wt %, less than 4 wt %, less than 3 wt %, less than 2 wt %, less than 1 wt %, or less than 0.1 wt % relative to the weight of aerogel before contact with liquid water when measured according to standard ASTM C1511.

In some embodiments, the liquid water uptake may be less than 100 wt %, less than 80 wt %, less than 70 wt %, less than 60 wt %, less than 50 wt %, less than 40 wt %, less than 30 wt %, less than 20 wt %, less than 10 wt %, less than 5 wt %, less than 4 wt %, less than 3 wt %, less than 2 wt %, less than 1 wt %, or less than 0.1 wt % relative to the weight of aerogel before contact with liquid water when measured according to standard ASTM C1763.

In some embodiments, the liquid water uptake may be less than 100 wt %, less than 80 wt %, less than 70 wt %, less than 60 wt %, less than 50 wt %, less than 40 wt %, less than 30 wt %, less than 20 wt %, less than 10 wt %, less than 5 wt %, less than 4 wt %, less than 3 wt %, less than 2 wt %, less than 1 wt %, or less than 0.1 wt % relative to the weight of aerogel before contact with liquid water when measured according to standard EN 1609.

In some embodiments, when the aerogel is submerged under water at 25° C. for 24 h, the aerogel uptakes a mass of water within its outer boundaries of less than 20% of the dry mass of the aerogel prior to submerging in the water.

Hydrophobicity of the aerogel can be expressed in terms of the water vapor uptake. The term water vapor uptake refers to the ability for a material or composition to absorb, adsorb, or otherwise retain water due to contact with water in the vapor state. Water vapor uptake can be expressed as a fraction or percent of water retained relative to the mass of the aerogel before exposure to water vapor. The water vapor uptake reported is understood to be a measurement undertaken under specific conditions. An aerogel material which has superior or improved water vapor uptake relative to a different aerogel material is understood to have a lower sorption or retention of water vapor. In some embodiments, the water uptake may be less than 100 wt %, less than 80 wt %, less than 70 wt %, less than 60 wt %, less than 50 wt %, less than 40 wt %, less than 30 wt %, less than 20 wt %, less than 10 wt %, less than 5 wt %, less than 4 wt %, less than 3 wt %, less than 2 wt %, less than 1 wt %, or less than 0.1 wt % relative to the weight of the aerogel before exposure to water vapor, when measured according to standard ASTM C1104. In some embodiments, the aerogel uptakes a mass of water within its outer boundaries of less than 20% of the dry mass of the aerogel prior to exposure to exposure to water vapor.

Hydrophobicity of the aerogel material can be expressed in terms of the water contact angle. The term water contact angle refers to the equilibrium contact angle of a drop of water in contact with a surface of the aerogel material. An aerogel that has superior or improved hydrophobicity relative to a different aerogel material may have a higher water contact angle. In some embodiments, the water contact angle may be greater than 90°, greater than 100°, greater than 110°, greater than 120°, greater than 130°, greater than 140°, greater than 150°, greater than 160°, greater than 170°, or between 170° and 180° when measured according to standard ASTM D7490. In some preferred embodiments, the aerogel exhibits a contact angle with water, in an ambient air environment at 1 atm and 25° C., greater than 90° when measured according to standard ASTM D7490.

In some embodiments, the aerogel may exhibit an internal specific surface area. As used herein, the internal surface area and specific surface area have the same meaning and describe the same phenomenon. As described herein, these values may also be referred to as the BET surface area. In some embodiments, the internal specific surface area of an aerogel may be determined using nitrogen adsorption porosimetry and deriving the surface area value using the Brunauer-Emmett-Teller (BET) model. For example, nitrogen sorption porosimetry may be performed using a Micromeritics Tristar II 3020 surface area and porosity analyzer. Before porosimetry analysis, specimens may be subjected to vacuum of ~100 torr for 24 hours to remove adsorbed water or other solvents from the pores of the specimens. The porosimeter may provide an adsorption isotherm and desorption isotherm, which comprise the amount of analyte gas adsorbed or desorbed as a function of partial pressure. Specific surface area may be calculated from the adsorption isotherm using the BET method over ranges typically employed in measuring surface area. In some embodiments, the BET surface area of the aerogel is greater than 50 $m^2/g$, greater than 100 $m^2/g$, greater than 200 $m^2/g$, greater than 300 $m^2/g$, greater than 400 $m^2/g$, greater than 500 $m^2/g$, greater than 600 $m^2/g$, greater than 700 $m^2/g$, greater than 800 $m^2/g$, greater than 1000 $m^2/g$, greater than 2000 $m^2/g$, greater than 3000 $m^2/g$, or less than 4000 $m^2/g$. In certain preferred embodiments, the BET surface area of the aerogel is between 50 $m^2/g$ and 800 $m^2/g$. Values of the BET surface area of the aerogel outside of these ranges may be possible. In some preferred embodiments, the aerogel exhibits a BET surface area greater than 200 $m^2/g$. In some preferred embodiments, the aerogel exhibits a BET surface area greater than 350 $m^2/g$.

In some embodiments, the bulk density of an aerogel may be determined by dimensional analysis. For example, bulk density may be measured by first carefully machining a specimen into a regular shape, e.g., a block or a rod. The length, width, and thickness (or length and diameter) may be measured using calipers (accuracy ±0.001"). These measurements may then be used to calculate the specimen volume by, in the case of a block, multiplying length*width*height, or in the case of a disc, multiplying the height*the radius squared*pi. Mass may be measured using a digital analytical balance with a precision of 0.001 g. Bulk density may then be calculated as density=mass/volume. In some embodiments, the bulk density of an aerogel may be between 0.05 g/cc and 0.1 g/cc, between 0.05 g/cc and 0.2 g/cc, between 0.05 g/cc and 0.3 g/cc, between 0.05 and 0.4 g/cc, between 0.05 g/cc and 0.5 g/cc, between 0.05 g/cc and 0.6 g/cc, between 0.05 g/cc and 0.7 g/cc, or greater than 0.7 g/cc. In certain embodiments, the density may be between 0.15 g/cc and 0.7 g/cc. In certain preferred embodiments, the density may be between 0.07 g/cc and 0.2 g/cc. In some preferred embodiments, the aerogel exhibits a bulk density between 0.06 to 0.2 g/cc.

In some embodiments, the aerogel comprises silica. In some embodiments the aerogel comprises trimethysilyl functionalized silica. In some embodiments the aerogel comprises trimethylsilyl functionalized silica aerogel comprising sodium ions. In some embodiments the aerogel comprises discrete particles of silica aerogel. In some embodiments the aerogel comprises discrete particles of trimethylsilyl functionalized silica aerogel. In some embodiments, the aerogel comprises silica in an amount of up to 5 wt %, up to 10 wt %, up to 20 wt %, or up to 25 wt %. In some embodiments, the aerogel comprises silica aerogel and polyimide aerogel.

In some embodiments, the aerogel has a compressive modulus (also known as Young's modulus, in some embodiments approximately equal to bulk modulus) and yield strength which may be determined using standard uniaxial compression testing. Compressive modulus and yield strength may be measured using the method outlined in standard ASTM D1621-10 "Standard Test Method for Compressive Properties of Rigid Cellular Plastics" followed as written with the exception that specimens are compressed with a crosshead displacement rate of 1.3 mm/s (as prescribed in standard ASTM D695) rather than 2.5 mm/s. In some embodiments, the aerogel may exhibit any suitable compressive modulus. In certain embodiments, the compressive modulus of the aerogel is greater than 100 kPa, greater than 500 kPa, greater than 1 MPa, greater than 10 MPa, greater than 50 MPa, greater than 100 MPa; or less than 100 MPa, less than 50 MPa, less than 10 MPa, less than 1 MPa, less than 500 kPa, less than 100 kPa, or less than 50 kPa. Combinations of the above noted ranges, or values outside of these ranges, are possible for the compressive modulus of the aerogel. In some preferred embodiments, the aerogel exhibits a compressive modulus greater than 1 MPa.

In some embodiments, the aerogel may exhibit any of a variety of suitable compressive yield strengths. In certain embodiments, the compressive yield strength of the aerogel is greater than 40 kPa, greater than 100 kPa, greater than 500 kPa, greater than 1 MPa, greater than 5 MPa, greater than 10 MPa, greater than 50 MPa, greater than 100 MPa, greater than 500 MPa; or less than 500 MPa, less than 100 MPa, less than 50 MPa, less than 10 MPa, less than 5 MPa, less than 1 MPa, less than 500 kPa, less than 100 kPa, or less than 50 kPa. Combinations of the above noted ranges, or values outside of these ranges, are possible for the compressive yield strength of the aerogel. In some preferred embodiments, the aerogel exhibits a compressive yield strength greater than 300 kPa.

In some embodiments, the aerogel has a flexural modulus and flexural yield strength which may be determined using a standard mechanical testing method. Flexural modulus and yield strength may be measured using the method outlined in standard ASTM D790-10 "Flexural Properties of Unreinforced and Reinforced Plastics and Electrical Insulating Materials" followed as written, with the exception that specimen span is equal to a fixed value of 45 mm rather than varied as a ratio of the thickness of the specimen. Specimen length is at least 10 mm greater than the span. Specimen depth is in the range of 5 mm to 7 mm. Specimen width is in the range of 15 mm to 20 mm. In certain embodiments, the flexural modulus of the aerogel, as measured by the described method, may be between 10 MPa and 20 MPa, between 20 MPa and 50 MPa, between 50 MPa and 100 MPa, between 100 MPa and 200 MPa, between 200 MPa and 300 MPa, or greater than 300 MPa. In some preferred embodiments, the aerogel exhibits a flexural modulus greater than 1 MPa.

In some embodiments, the flexural yield strength of the aerogel is greater than 0.2 MPa, greater than 0.5 MPa, greater than 1 MPa, greater than 1.5 MPa, greater than 2 MPa, greater than 2.5 MPa, greater than 3 MPa, greater than 3.5 MPa, or greater than 4 MPa. In some preferred embodiments, the aerogel exhibits a flexural yield strength greater than 500 kPa.

In some embodiments, the aerogel has a dielectric constant and loss tangent which may be determined using a standard testing method. Dielectric constant and loss tangent may be measured using the method outlined in standard ASTM D2520-13 "Complex Permittivity (Dielectric Constant) of Solid Electrical Insulating Materials at Microwave Frequencies and Temperatures up to 1650° C." In certain embodiments, the aerogel exhibits an average dielectric constant over the range of 0-50 GHz of less than 100, less than 10, less than 5, less than 2, less than 1.75, less than 1.5, or less than 1.25. In certain preferred embodiments, the aerogel exhibits an average dielectric constant over the range of 0-50 GHz of less than 1.4. In certain embodiments, the aerogel exhibits an average loss tangent over the range of 0-50 GHz of less than 1, less than 0.1, less than 0.01, less than 0.001, or less than 0.0001. In certain preferred embodiments, the aerogel exhibits an average loss tangent over the range of 0-50 GHz of less than 0.01.

In some embodiments, the aerogel has at least one dimension between 10 microns and 1 mm.

In some embodiments, the aerogel has at least one dimension equal to or greater than 10 cm, greater than 30 cm, greater than 50 cm, and/or greater than 100 cm. In some preferred embodiments, the aerogel has at least one dimension greater than or equal to 30 cm.

In some embodiments, the aerogel can exhibit a relatively high acoustic attenuation. Acoustic attenuation of the aerogel can be expressed in terms sound transmission loss. The term sound transmission loss is defined in standard ASTM C634. In certain embodiments, the aerogel exhibits a sound transmission loss of greater than 1 dB/cm, greater than 5 dB/cm, greater than 10 dB/cm, greater than 11 dB/cm, greater than 12 dB/cm, greater than 13 dB/cm, greater than 14 dB/cm, greater than 15 dB/cm, greater than 16 dB/cm, greater than 17 dB/cm, greater than dB/cm, greater than 18 dB/cm, greater than 19 dB/cm, greater than 20 dB/cm, greater than 30 dB/cm, greater than 40 dB/cm, and/or greater than 50 dB/cm when measured according to standard ASTM E2611. In certain embodiments, the aerogel exhibits sound transmission loss of greater than 1 dB/cm, greater than 5 dB/cm, greater than 10 dB/cm, greater than 11 dB/cm, greater than 12 dB/cm, greater than 13 dB/cm, greater than 14 dB/cm, greater than 15 dB/cm, greater than 16 dB/cm, greater than 17 dB/cm, greater than 18 dB/cm, greater than 19 dB/cm, greater than 20 dB/cm, greater than 30 dB/cm, greater than 40 dB/cm, and/or greater than 50 dB/cm when measured according to standard ASTM E90. In some preferred embodiments, the aerogel exhibits an average sound transmission loss over the frequency range of 300 Hz-2000 Hz greater than 5 dB/cm.

The aerogel may exhibit any suitable pore structure. Pore width distribution, pore area distribution, and mean pore size may be calculated from the nitrogen desorption isotherm using the Barrett-Joyner-Halenda (BJH) method over ranges typically reemployed in measuring pore width and pore area distribution. In some embodiments, the aerogel comprises pores of less than 100 microns, less than 10 microns, less than 1 micron, less than 500 nm, less than 250 nm, less than 100 nm, less than 50 nm, less than 25 nm, less than 20 nm, less than 15 nm, and/or less than 10 nm. In some embodiments the aerogel comprises pores of greater than 10 nm, greater than 15 nm, greater than 20 nm, greater than 25 nm, greater than 50 nm, greater than 100 nm, greater than 250 nm, greater than 500 nm, greater than 1 micron, greater than 10 microns, and or greater than 100 microns. In some preferred embodiments the aerogel comprises pores of 1 micron or greater. Average pore width, e.g., mean pore size, (assuming cylindrical pores) may be calculated using pore width=4*(total specific volume)/(specific surface area) where total specific volume and specific surface area may also be calculated using BJH analysis of the desorption isotherm. In some embodiments, the average pore width is less than 10 nm, less than 20 nm, less than 30 nm, less than 40 nm, less than 50 nm, less than 60 nm, less than 70 nm, less than 80 nm, less than 90 nm, less than 100 nm, less than 500 nm, less than 1 μm, less than 10 μm, less than 100 μm, or less than 1 mm. In certain preferred embodiments, the average pore width is less than 50 nm. In some preferred embodiments, the average pore width of the aerogel is less than 20 nm.

In some embodiments, the pore width distribution of the aerogel may be unimodal (i.e., exhibiting a single maximum). In some embodiments, the pore width distribution maximum is found at less than 10 nm, less than 20 nm, less than 30 nm, less than 40 nm, less than 50 nm, less than 60 nm, less than 70 nm, less than 80 nm, less than 90 nm, less than 100 nm, less than 500 nm, less than 1 μm, less than 10 μm, less than 100 μm, or less than 1 mm. In some embodiments, the aerogel comprises a unimodal pore size distribution.

In some embodiments, the pore width distribution of the aerogel may be bimodal, or at least bimodal. In some embodiments, the aerogel material can have two distinct populations of pores, one with an average pore size less than a certain critical pore width, and one with an average pore size greater than some critical pore width. In some embodiments, the critical pore width is less than 10 nm, less than 20 nm, less than 30 nm, less than 40 nm, less than 50 nm, less than 60 nm, less than 70 nm, less than 80 nm, less than 90 nm, less than 100 nm, less than 500 nm, less than 1 μm, less than 10 μm, less than 100 μm, or less than 1 mm. In some embodiments, the aerogel comprises a bimodal pore size distribution.

Thermal conductivity of an aerogel may be measured using a calibrated hot plate (CHP) device. The CHP method is based on the principle underlying standard ASTM E1225 "Standard Test Method for Thermal Conductivity of Solids by Means of the Guarded-Comparative-Longitudinal Heat Flow Technique". An apparatus in which an aerogel and/or other sample material (the mass, thickness, length, and width of which have been measured as explained in the procedure for measuring bulk density) is placed in series with a standard reference material (e.g. NIST SRM 1453 EPS board) of precisely known thermal conductivity, density, and thickness, between a hot surface and a cold surface. The hot side of the system comprises an aluminum block (4"×4"×1") with three cartridge heaters embedded in it. The cartridge heaters are controlled by a temperature controller operating in on/off mode. The set-point feedback temperature for the controller is measured at the center of the top surface of the aluminum block (at the interface between the block and the sample material) by a type-K thermocouple (referred to as TC_H). A second identical thermocouple is placed directly beside this thermocouple (referred to as TC_1). The sample material is placed on top of the aluminum block, such that the thermocouples are near its center. A third identical thermocouple (TC_2) is placed directly above the others at the interface between the sample material and the reference material. The reference material is then placed on top of the sample material covering the thermocouple. A fourth identical thermocouple (TC_3) is placed on top of the reference material, in line with the other three thermocouples. Atop this stack of materials a 6" diameter stainless steel cup filled with ice water is placed, providing an isothermal cold surface. Power is supplied to the heaters and regulated by the temperature controller such that the hot side of the system is kept at a constant temperature of approximately 37.5° C. After ensuring all components are properly in place, the system is turned on and allowed to reach a state of equilibrium. At that time, temperatures at TC_1, TC_2, and TC_3 are recorded. This recording is repeated every 15 minutes for at least one hour. From each set of temperature measurements (one set being the three temperatures measured at the same time), the unknown thermal conductivity can be calculated as follows. By assuming one-dimensional conduction (i.e., neglecting edge losses and conduction perpendicular to the line on which TC_1, TC_2, and TC_3 sit) one can state that the heat flux through each material is defined by the difference in temperature across that material divided by the thermal resistance per unit area of the material (where thermal resistance per unit area is defined by $R''=t/k$, where t is thickness in meters and k is thermal conductivity in W/m-K). The thickness, t, is measured while subjecting the sample material to a pressure equal to that which is experienced by the sample material during the CHP thermal conductivity test. For example, thickness of a sample material may be measured by sandwiching the sample material between a fixed rigid surface and a moveable rigid plate, parallel to the rigid surface, and applying a known pressure to the material sample by applying a known force to the rigid plate. Using any suitable means, for example a dial indicator or depth gauge, the thickness of this stack of materials, t_1, may be measured. The material sample is then removed from this stack of materials and the thickness, t_2, of the rigid plate is measured under the same force as previously prescribed. The thickness of the material sample under the prescribed pressure can thus be calculated by subtracting t_2 from t_1. The preferred range of material sample thickness for use in this thermal conductivity measurement is between 2 and 10 mm. Using material sample thicknesses outside of this range may introduce a level of uncertainty and/or error into the thermal conductivity calculation such that the measured values are no longer accurate and/or reliable. By setting the heat flux through the sample material equal to the heat flux through the reference material, the thermal conductivity of the sample material can be solved for (the only unknown in the equation). This calculation is performed for each temperature set, and the mean value is reported as the sample thermal conductivity. The thermocouples used can be individually calibrated against a platinum RTD, and assigned unique corrections for zero-offset and slope, such that the measurement uncertainty is ±0.25° C. rather than ±2.2° C. In certain embodiments, the thermal conductivity at 25° C. of the aerogel, as measured by the method described herein, may be less than 100 mW/m-K, less than 75 mW/m-K, less than 50 mW/m-K, less than 35 mW/m-K, less than 25 mW/m-K, less than 23 mW/m-K, less than 20 mW/m-K, or 26 mW/m-K. In some preferred embodiments, the aerogel exhibits a thermal conductivity of less than 30 mW/m-K at 25° C.

In certain embodiments, the aerogel is non-flammable.

In some embodiments, the aerogel meets the criteria for Class A1, Class A2, and/or Class B fire behavior of the European classification standard EN 13501-1.

In certain embodiments, the aerogel meets the criteria for flame time, drip flame time, and/or burn length set forth in Part 25.853a of the United States Federal Aviation Regulations.

In some embodiments, the aerogel meets the criteria for total heat release within the first two minutes, peak heat release rate, and/or 4.0-minute smoke density set forth in Part 25.853d of the United States Federal Aviation Regulations.

In accordance with some embodiments, aerogels may be prepared in a variety of form factors. In some embodiments, monolithic parts may be produced. One of ordinary skill in the art would appreciate the meaning of monolithic as referring to a whole, contiguous, macroscopic part or object as opposed to, for example, a powdered or granular form of a material, a sub-volume of a part or object, or an embedded/integrated component of a material, e.g., one of the networks in an aerogel comprising interpenetrating networks. In some embodiments, the part may have complex features. In some embodiments, flexible tapes may be produced. In some embodiments, thin films with thicknesses ranging from 1 micron to 1 mm may be produced. In some embodiments, the shape of an aerogel may be changed by CNC milling, sawing, drilling, stamping, sanding, grinding, bending, compressing, rolling, and/or thermoforming.

In some embodiments, the aerogel is used in a vehicle. In some embodiments, the vehicle is an automobile, an airplane, a rocket, and/or a boat. In some embodiments, the aerogel is used as an aircraft wall panel. In some embodiments, the aerogel is used as an engine cover.

In some embodiments, aerogels are suitable for use as soundproofing, a component in a ballistics shield, panel, armor, protective vest, and/or bullet-proof armor, and/or vibration mitigating insulation. In some preferred embodiments, the aerogel is used in a ballistics armor, shield, panel, composite, and/or protective vest.

In some embodiments, the aerogel is used in a shoe, boot, or insole.

In some embodiments, the aerogel may be carbonizable. In some embodiments, a carbonized derivative of the aerogel may be produced.

In accordance with certain embodiments, aerogel materials may be made from a precursor gel material. For example, some embodiments comprise preparing a precursor gel and removing liquid from the gel to form an aerogel. Various methods of forming aerogels are described below and elsewhere herein. Similarly, various methods of forming aerogel precursors (e.g., gels) are described below.

As provided herein, a gel is a colloidal system in which a porous, solid-phase network spans the volume occupied by a liquid medium. Accordingly, gels have two components: a sponge-like solid skeleton, which gives the gel its solid-like cohesiveness, and a liquid that permeates the pores of that skeleton.

Certain aspects are related to methods of forming aerogels, gels, or precursors thereof.

In certain embodiments, the method comprises combining an amount of biphenyl-3,3',4,4'-tetracarboxylic dianhydride (BPDA), a first diamine, and a solvent. The combination can be performed in any of a variety of ways. Some embodiments comprise first combining the BPDA and the solvent and subsequently adding the first diamine. Other embodiments comprise first combining the first diamine and the solvent and subsequently adding the BPDA. Still other embodiments comprise simultaneously combining the BPDA, the first diamine, and the solvent In some embodiments, combining the amount of BPDA, the first diamine, and the solvent is performed such that a first intermediate medium comprising anhydride-capped poly(amic acid) trimer is formed.

In certain embodiments, the method comprises combining the first intermediate medium and a second diamine. In some embodiments, combining the first intermediate medium and the second diamine is performed such that a second intermediate medium comprising pentamer is formed.

In some embodiments, the method comprises combining the second intermediate medium and an additional amount of BPDA. In certain embodiments, combining the second intermediate and the additional amount of BPDA is performed such that a third intermediate comprising heptamer is formed.

In some embodiments, the method comprises combining the third intermediate medium and a third diamine such that a fourth intermediate medium is formed. In certain embodiments, combining the third intermediate and third diamine is performed such that a fourth intermediate medium comprising oligomer chains is formed.

In certain embodiments, the method comprises combining the fourth intermediate medium and a crosslinking reagent. In some embodiments, combining the fourth intermediate medium and the crosslinking reagent is performed such that a gel is formed. In some embodiments, the crosslinking agent comprises three or more amine groups. In some embodiments, the crosslinking agent comprises a functional group that reacts with a terminal group on the oligomers to produce a crosslinking-agent-terminated oligomer. In some embodiments, the crosslinking agent comprises functional groups that react with another crosslinking agent molecule and/or another crosslinking-agent-terminated oligomer to connect crosslinking-agent-terminated oligomers together. In some embodiments, the crosslinking agent is introduced at a balanced stoichiometry of a functional group on the crosslinking agent that is reactive towards a terminal group on the polyimide oligomer to the complementary terminal groups on the polyimide oligomers. In some embodiments, two or more oligomers are attached to the same crosslinking agent. In some embodiments, the resulting network is chemically imidized to yield a porous crosslinked polyimide network. In some embodiments, the oligomers are imidized prior to crosslinking. In some embodiments, the oligomers are imidized concurrently with crosslinking.

In some embodiments, the crosslinking agent comprises a triamine; an aliphatic triamine; an aromatic amine comprising three or more amine groups; an aromatic triamine; 1,3,5-tris(aminophenoxy)benzene (TAB); tris(4-aminophenyl)methane (TAPM); tris(4-aminophenyl)benzene (TAPB); tris(4-aminophenyl)amine (TAPA); 2,4,6-tris(4-aminophenyl)pyridine (TAPP); 4,4',4''-methanetriyltrianiline; N,N,N',N'-tetrakis(4-aminophenyl)-1,4-phenylenediamine; a polyoxypropylenetriamine; N',N'-bis(4-aminophenyl)benzene-1,4-diamine; a triisocyanate; an aliphatic triisocyanate; an aromatic isocyanate comprising three or more isocyanate groups; an aromatic triisocyanate; a triisocyanate based on hexamethylene diisocyanate; the trimer of hexamethylenediisocyanate; hexamethylenediisocyanate; a polyisocyanate; a polyisocyanate comprising isocyanurate; Desmodur® N3200; Desmodur N3300; Desmodur N100; Desmodur N3400; Desmodur N3390; Desmodur N3390 BA/SN; Desmodur N3300 BA; Desmodur N3600; Desmodur N3790 BA; Desmodur N3800; Desmodur N3900; Desmodur XP 2675; Desmodur blulogiq 3190; Desmodur XP 2860; Desmodur N3400; Desmodur XP 2840; Desmodur N3580 BA; Desmodur N3500; Desmodur RE; tris(isocyanatophenyl)methane; Desmodur RC; Mondur® MR; Mondur MRS; a methylene diphenyl diisocyanate; diphenylmethane 2,2'-, 2,4'- and/or 4,4'-diisocyanate (MDI); naphthylene 1,5-diisocyanate (NDI); a toluene diisocyanate; toluene 2,4- and/or 2,6-diisocyanate (TDI); 3,3'-dimethylbiphenyl diisocyanate; 1,2-diphenylethane diisocyanate and/or p-phenylenediisocyanate (PPDI); trimethylene-, tetramethylene-, pentamethylene-, hexamethylene-, heptamethylene-, and/or octamethylenediisocyanate; 2-methylpentamethylene 1,5-diisocyanate; 2-ethylbutylene 1,4-diisocyanate; pentamethylene 1,5-diisocyanate; butylene 1,4-diisocyanate; 1-isocyanato-3,3,5-trimethyl-5-isocyanatomethylcyclohexane (isophoronediisocyanate, IPDI); 1,4- and/or 1,3-bis(isocyanatomethyl)cyclohexane (HXDI); cyclohexane 1,4-diisocyanate; 1-methylcyclohexane 2,4- and/or 2,6-diisocyanate; dicyclohexylmethane 4,4'-, 2,4'- and/or 2,2'-diisocyanate; octa(aminophenoxy)silsesquioxane (OAPS); 4,4-oxydianiline (ODA); (3-aminopropyl)triethoxysilane (APTES); modified graphene oxides (m-GO); 1,3,5-benzenetricarbonyl trichloride (BTC); poly(maleic anhydride) (PMA); an imidazole or a substituted imidazole; a triazole or substituted triazole; a purine or substituted purine; a pyrazole or substituted pyrazole; and/or melamine.

In some embodiments, the crosslinker comprises an isocyanurate group, a silicon-oxygen bridge, a trisubstituted benzene ring, a silsesquioxane group, a phenoxy group, a tris(phenyl)methyl group, an imidazole group, and/or an alkyl group.

In some embodiments, the first diamine is different from the second diamine and the third diamine. In certain embodiments, the second diamine is different from the third diamine.

In some embodiments, the first diamine, the second diamine, and the third diamine are selected from the group consisting of 3,4'-oxydianiline (3,4-ODA); 4,4'-oxydianiline (4,4-ODA or ODA); p-phenylene diamine (pPDA); m-phenylene diamine (mPDA); p-phenylene diamine (mPDA); 2,2'-dimethylbenzidine (DMBZ); 4,4'-bis(4-aminophenoxy) biphenyl; 2,2'-bis[4-(4-aminophenoxyl)phenyl]propane; bisaniline-p-xylidene (BAX); 4,4'-methylene dianiline (MDA); 4,4'-[1,3-phenylenebis(1-methyl-ethylidene)] bisaniline (bisaniline-m); 4,4'-[1,4-phenylenebis(1-methyl-ethylidene)]bisaniline (bisaniline-p); 3,3'-dimethyl-4,4'-diaminobiphenyl (o-tolidine); 2,2-bis [4-(4-aminophenoxy) phenyl] propane (BAPP); 3,3'-dihydroxy-4,4'-diaminobiphenyl (HAB); 3,3'-diaminodiphenyl sulfone (3,3'-DDS); 4,4'-diaminodiphenyl sulfone (4,4'-DDS); 4,4'-diaminodiphenyl sulfide (ASD); 2,2-bis[4-(4-aminophenoxy) phenyl] sulfone (BAPS); 2,2-bis[4-(3-aminophenoxy) benzene] (m-BAPS); 1,4-bis(4-aminophenoxy) benzene (TPE-Q); 1,3-bis(4-aminophenoxy) benzene (TPE-R); 1,3'-bis(3-aminophenoxy) benzene (APB-133); 4,4'-bis(4-aminophenoxy) biphenyl (BAPB); 4,4'-diaminobenzanilide (DABA); 9,9'-bis(4-aminophenyl) fluorene (FDA); o-tolidine sulfone (TSN); methylene bis(anthranilic acid) (MBAA); 1,3'-bis(4-aminophenoxy)-2,2-dimethylpropane (DANPG); 2,3,5,6-tetramethyl-1,4-phenylenediamine (TMPD); 3,3',5,5'-tetramethylbenzidine (3355TMB); 1,5-bis(4-aminophenoxy) pentane (DASMG); 2,5-diaminobenzotrifluoride (25DBTF); 3,5-diaminobenzotrifluoride (35DBTF); 1,3-diamino-2,4,5,6-tetrafluorobenzene (DTFB); 2,2'-bis(trifluoromethyl)benzidine (22TFMB); 3,3'-bis(trifluoromethyl) benzidine (33TFMB); 2,2-bis[4-(4-aminophenoxy phenyl)] hexafluoropropane (HFBAPP); 2,2-bis(4-aminophenyl) hexafluoropropane (Bis-A-AF); 2,2-bis(3-amino-4-hydroxyphenyl)hexafluoropropane (Bis-AP-AF); 2,2-bis(3-amino-4-methylphenyl)hexafluoropropane (Bis-AT-AF); o-phenylene diamine; diaminobenzanilide; 3,5-diaminobenzoic acid; 3,3'diaminodiphenylsulfone; 4,4'-diaminodiphenylsulfone; 1,3-bis(4-aminophenoxy)benzene; 1,3-bis(3-aminophenoxy)benzene; 1,4-bis(4-aminophenoxy)benzene; 1,4-bis(3-aminophenoxy)benzene; 2,2-bis[4-(4-aminophenoxy)phenyl]hexafluoropropane; 2,2-bis(3-aminophenyl) hexafluoropropane; 4,4'-isopropylidenedianiline; 1-(4-aminophenoxy)-3-(3-aminophenoxy)benzene; 1-(4-aminophenoxy)-4-(3-aminophenoxy)benzene; bis[4-(4-aminophenoxy)phenyl]sulfone; bis[4-(3-aminophenoxy) phenyl]sulfone; bis(4-[4-aminophenoxy]phenyl)ether; 2,2'-bis(4-aminophenyl)hexafluoropropene; 2,2'-bis(4-phenoxyaniline)isopropylidene; 1,2-diaminobenzene; 4,4'-diaminodiphenylmethane; 2,2-bis(4-aminophenyl)propane; 4,4'-diaminodiphenylpropane; 4,4'-diaminodiphenylsulfide; 4,4-diaminodiphenylsulfone; 3,4'-diaminodiphenylether; 4,4'-diaminodiphenylether; 2,6-diaminopyridine; bis(3-aminophenyl)diethylsilane; 4,4'-diaminodiphenyldiethylsilane; benzidine-3'-dichlorobenzidine; 3,3'-dimethoxybenzidine; 4,4'-diaminobenzophenone; N,N-bis(4-aminophenyl) butylamine; N,N-bis(4-aminophenyl)methylamine; 1,5-diaminonaphthalene; 3,3'-dimethyl-4,4'-diaminobiphenyl; 4-aminophenyl-3-aminobenzoate; N,N-bis(4-aminophenyl) aniline; bis(p-beta-amino tert-butyl phenyl)ether; p-bis-2-(2-methyl-4-aminopentyl)benzene; p-bis(1,1-dimethyl-5-aminopentyl)benzene; 1,3-bis(4-aminophenoxy)benzene; m-xylene diamine; p-xylene diamine; 4,4'-diamino diphenylether phosphine oxide; 4,4'-diamino diphenyl N-methyl-amine; 4,4'-diamino diphenyl N-phenylamine; amino-terminal polydimethylsiloxanes; amino-terminal polypropylene oxides; amino-terminal polybutylene oxides; 4,4'-methylene bis(2-methyl cyclohexylamine); 1,2-diaminoethane; 1,3-diaminopropane; 1,4-diaminobutane; 1,5-diaminopentane; 1,6-diaminohexane; 1,7-diaminoheptane; 1,8-diaminooctane; 1,9-diaminononane; 1,10-diaminodecane; 4,4'-methylene bis(benzeneamine); 2,2'-dimethyl benzidine; bisaniline-p-xylidene; 4,4'-bis(4-aminophenoxy)biphenyl; 3,3'-bis(4-aminophenoxy)biphenyl; 4,4'-(1,4-phenylene diisopropylidene)bisaniline; and/or 4,4'-(1,3-phenylene diisopropylidene)bisaniline.

In some preferred embodiments, the first diamine, the second diamine, and the third diamine are selected from the group consisting of 2,2'-dimethylbenzidine (DMBZ), 4,4'-oxydianiline (4,4-ODA), and 4,4'-[1,3-phenylenebis(1-methyl-ethylidene)]bisaniline (bisaniline-m). In some further preferred embodiments, the first, second, or third diamine is bisaniline-m.

In certain embodiments, the first diamine is DMBZ, the second diamine is 4,4-ODA, and the third diamine is bisaniline-m. In certain embodiments, the first diamine is bisaniline-m, the second diamine is DMBZ, and the third diamine is 4,4-ODA. In certain embodiments the first diamine is bisaniline-m, the second diamine is 4,4-ODA, and the third diamine is DMBZ. In certain embodiments the first diamine is 4,4-ODA, the second diamine is DMBZ, and the third diamine is bisaniline-m. In certain embodiments the first diamine is 4,4-ODA, the second diamine is bisaniline-m, and the third diamine is DMBZ. In certain preferred embodiments the first diamine is DMBZ, the second diamine is bisaniline-m, and the third diamine is 4,4-ODA.

In some embodiments, combining the amount of BPDA, the first diamine, and the solvent comprises combining the first diamine and the amount of BPDA in a relative amount, based on a ratio of the amount of BPDA to the first diamine, of between 0.9:1 and 1.1:1, between 1.4:1 and 1.6:1, between 1.6:1 and 1.8:1, between 1.9:1 and 2.1:1, and/or between 2.9:1 and 3.1:1. In some preferred embodiments, combining the amount of BPDA, the first diamine, and the solvent comprises combining the first diamine and the amount of BPDA in a relative amount, based on a ratio of the amount of BPDA to the first diamine, of between 1.9:1 and 2.1:1. In some embodiments, combining the first intermediate medium and a second diamine comprises combining the anhydride capped poly(amic acid) trimer and the second diamine in a relative amount, based on a molar ratio of the second diamine to the anhydride-capped poly(amic acid) trimer of between 0.9:1 and 1.1:1, between 1.4:1 and 1.6:1, between 1.6:1 and 1.8:1, between 1.9:1 and 2.1:1, and/or between 2.9:1 and 3.1:1. In some preferred embodiments, combining the first intermediate medium and a second diamine comprises combining the anhydride capped poly (amic acid) trimer and the second diamine in a relative amount, based on a molar ratio of the second diamine to the anhydride-capped poly(amic acid) trimer of between 1.9:1 and 2.1:1. In some embodiments, combining the second intermediate medium and the additional amount of BPDA comprises combining the pentamer and the additional amount of BPDA in a relative amount, based on a molar ratio of the additional amount of BPDA to the pentamer, of between 0.9:1 and 1.1:1, between 1.4:1 and 1.6:1, between 1.6:1 and 1.8:1, between 1.9:1 and 2.1:1, and/or between 2.9:1 and 3.1:1. In some preferred embodiments, combining the second intermediate medium and the additional amount of BPDA comprises combining the pentamer and the additional amount of BPDA in a relative amount, based on a molar ratio of the additional amount of BPDA to the pentamer, of between 1.9:1 and 2.1:1. In some embodiments, combining the third intermediate medium and the third diamine comprises combining the heptamer and the third diamine in a relative amount, based on the molar ratio of the third diamine to the heptamer, of between 0.4:1 and 0.6:1, between 0.8:1 and 1.1:1, between 0.8:1 and 1.1:1, between 1.8:1 and 2.2:1. In some preferred embodiments, combining the third intermediate medium and the third diamine comprises combining the heptamer and the third diamine in a relative amount, based on the molar ratio of the third diamine to the heptamer, of between 0.8:1 and 1.1:1. In some embodiments, combining the fourth intermediate medium and the crosslinking reagent comprises combining the oligomer chains and the crosslinking reagent in a relative amount, based on the molar ratio of the crosslinker to the oligomer chain, of between 0.5:1 and 0.75:1, 0.8:1 and 1.1:1, an/or between 1.4:1 and 1.6:1. In some embodiments the ratio is between 0.9:1 and 1.1:1, between 1.4:1 and 1.6:1, between 1.6:1 and 1.8:1, between 1.9:1 and 2.1:1, and/or between 2.9:1 and 3.1:1. In some preferred embodiments, combining the fourth intermediate medium and the crosslinking reagent comprises combining the oligomer chains and the crosslinking reagent in a relative amount, based on the molar ratio of the crosslinker to the oligomer chain, of between 1.9:1 and 2.1:1. In some preferred embodiments, combining the fourth intermediate medium and the crosslinking reagent comprises combining the oligomer chains and the crosslinking reagent in a relative amount, based on the molar ratio of the crosslinker to the oligomer chain, of between 0.5:1 and 0.75:1.

In some embodiments, combining the fourth intermediate medium and the crosslinking agent also comprises combining a catalyst with the fourth intermediate medium and the crosslinking agent. In some embodiments the catalyst comprises pyridine; a methylpyridine; quinoline; isoquinoline; 1,8-diazabicyclo[5.4.0]undec-7-ene (DBU); DBU phenol salts; carboxylic acid salts of DBU; triethylenediamine; a carboxylic acid salt of triethylenediamine; lutidine; n-methylmorpholine; triethylamine; tripropylamine; tributylamine; N,N-dimethylbenzylamine; N,N'-dimethylpiperazine; N,N-dimethylcyclohexylamine; N,N',N''-tris(dialkylaminoalkyl)-s-hexahydrotriazines, for example N,N',N''-tris(dimethylaminopropyl)-s-hexahydrotriazine; tris(dimethylaminomethyl)phenol; bis(2-dimethylaminoethyl) ether; N,N,N,N,N-pentamethyldiethylenetriamine; methylimidazole; dimethylimidazole; dimethylbenzylamine; 1,6-diazabicyclo[5.4.0]undec-7-ene (IUPAC: 1,4-diazabicyclo[2.2.2]octane); triethylenediamine; dimethylaminoethanolamine; dimethylaminopropylamine; N,N-dimethylaminoethoxyethanol; N,N,N-trimethylaminoethylethanolamine; triethanolamine; diethanolamine; triisopropanolamine; diisopropanolamine; and/or any suitable trialkylamine. In some preferred embodiments, the catalyst comprises triethylamine and/or tripropylamine.

In some embodiments, combining the fourth intermediate medium and the crosslinking reagent also comprises combining a water scavenger with the fourth intermediate medium and the crosslinking agent. In some embodiments, combining the fourth intermediate medium and the crosslinking reagent comprises combining the oligomer chains and the water scavenger in a relative amount, based on the molar ratio of the water scavenger to BPDA, of between 2:1 and 4:1, between 4:1 and 6:1, between 6:1 and 8:1, and or between 8:1 and 10:1. In some preferred embodiments the ratio is between 7:1 and 9:1. In some embodiments the water scavenger comprises acetic anhydride, propionic anhydride, n-butyric anhydride, benzoic anhydride, trifluoroacetic anhydride, phosphorous trichloride, and/or dicyclohexylcarbodiimide. In some preferred embodiments the water scavenger comprises acetic anhydride.

In some embodiments, a solvent is used. In some embodiments the solvent comprises dimethylsulfoxide; diethylsulfoxide; N,N-dimethylformamide; N,N-diethylformamide; N,N-dimethylacetamide; N,N-diethylacetamide; N-methyl-2-pyrrolidone; 1-methyl-2-pyrrolidinone; N-cyclohexyl-2-imidazolidinone; diethylene glycol dimethoxyether; o-dichlorobenzene; phenols; cresols; xylenol; catechol; butyrolactones; acetone; methyl ethyl ketone; ethyl ethyl ketone; methyl propyl ketone; acetonitrile; ethyl acetate; and/or hexamethylphosphoramides. In some preferred embodiments the solvent comprises N-methyl-2-pyrrolidone.

In some embodiments, the total amount of monomer is determined relative to the amount of solvent used. In certain embodiments, the total mass of all monomers is greater than 5% of the total mass of the solvent.

In some embodiments, a gel is formed. In some embodiments, the liquid is removed from the gel to produce an aerogel.

In some embodiments, a polyimide aerogel may be made from a suitable polyimide gel using any suitable drying technique, for example, supercritical $CO_2$ drying, supercritical extraction, evaporative drying, boiling, vacuum freeze drying, and/or atmospheric-pressure freeze drying.

In some embodiments, the gel is solvent exchanged into an organic solvent, i.e., the pore fluid, also called pore liquor, within the gels is substantially replaced by the organic solvent through diffusive soaking in a bath of the target organic solvent, after which the gel was subsequently dried via any suitable method for making an aerogel. In some embodiments, the gel is solvent exchanged into acetone, and then subsequently dried via any suitable method for making an aerogel. In some embodiments the liquid in the gel is first at least partially replaced by carbon dioxide, after which the carbon dioxide is then removed from the gel. In some embodiments, the drying method comprises subcritical $CO_2$ evaporative drying, supercritical drying from $CO_2$, supercritical drying from organic solvent, ambient-pressure evaporation of solvent from gel, freeze drying of the gel and or ambient-pressure freeze drying of the gel.

Aerogels may be fabricated by removing the liquid from a gel in a way that substantially preserves both the porosity and integrity of the gel's intricate nanostructured solid network. For most gel materials, if the liquid in the gel is evaporated, capillary stresses will arise as the vapor-liquid interface recedes into and/or from the gel, causing the gel's solid network to shrink and/or pull inwards on itself, and collapse. The resulting material is a dry, comparatively dense, low-porosity (generally <10% by volume) material that is often referred to as a xerogel material, or a solid formed from the gel by drying with unhindered shrinkage. However, the liquid in the gel may instead be heated and pressurized past its critical point, a specific temperature and pressure at which the liquid will transform into a semi-liquid/semi-gas, or supercritical fluid, that exhibits little surface tension, if at all. Below the critical point, the liquid is in equilibrium with a vapor phase. As the system is heated and pressurized towards its critical point, however, molecules in the liquid develop an increasing amount of kinetic energy, moving past each other increasingly fast until eventually their kinetic energy exceeds the intermolecular adhesion forces that give the liquid its cohesion. Simultaneously, the pressure in the vapor also increases, bringing molecules on average closer together until the density of the vapor becomes nearly and/or substantially as dense as the liquid phase. As the system reaches the critical point, the liquid and vapor phases become substantially indistinguishable and merge into a single phase that exhibits a density and thermal conductivity comparable to a liquid, yet is also able to expand and compress in a manner similar to a gas. Although technically a gas, the term supercritical fluid may refer to fluids near but past their critical point as such fluids, due to their density and kinetic energy, exhibit liquid-like properties that are not typically exhibited by ideal gases, for example, the ability to dissolve other substances. Since phase boundaries do not typically exist past the critical point, a supercritical fluid exhibits no surface tension and thus exerts no capillary forces, and can be removed from a gel without causing the gel's solid skeleton to collapse by isothermal depressurization of the fluid. After fluid removal, the resulting dry, low-density, high-porosity material is an aerogel.

The critical point of most substances typically lies at relatively high temperatures and pressures, thus, supercritical drying generally involves heating gels to elevated temperatures and pressures and, hence, is performed in a pressure vessel. For example, if a gel contains ethanol as its pore fluid, the ethanol can be supercritically extracted from the gel by placing the gel in a pressure vessel containing additional ethanol, slowly heating the vessel past the critical temperature of ethanol (241° C.), and allowing the autogenic vapor pressure of the ethanol to pressurize the system past the critical pressure of ethanol (60.6 atm). At these conditions, the vessel can then be quasi-isothermally depressurized so that the ethanol diffuses out of the pores of the gel without recondensing into a liquid. Likewise, if a gel contains a different solvent in its pores, the vessel may be heated and pressurized past the critical point of that solvent. Extraction of organic solvent from a gel requires specialized equipment, however, since organic solvents at their critical points can be dangerously flammable and explosive. Instead of supercritically extracting an organic solvent directly from a gel, the liquid in the pores of the gel may instead first be exchanged with a safer, nonflammable liquid, namely, carbon dioxide, which is typically miscible with most organic solvents and which has a relatively low critical point of 31.1° C. and 72.9 atm. In some embodiments, instead of first replacing the liquid in the pores of the gel with liquid $CO_2$ and then performing supercritical extraction of the $CO_2$, the liquid in a gel may instead be extracted by flowing supercritical $CO_2$ over the gel. Such so-called supercritical $CO_2$ drying processes are commonly employed in the manufacture of aerogel materials. In accordance with some embodiments described herein, supercritical $CO_2$ drying may be used to make aerogels.

In some embodiments, aerogels may be fabricated by removing the liquid from a gel by evaporative drying of the solvent. In some embodiments, the pore fluid exhibits a sufficiently low surface tension to prevent damaging the gel when evaporated, for example, less than 20 dynes/cm, less than 15 dynes/cm, less than 12 dynes/cm, or less than 10 dynes/cm. In certain embodiments, the surface tension of the solvent is equal to or less than 20 dynes/cm, equal to or less than 15 dynes/cm, equal to or less than 12 dynes/cm, or equal to or less than 10 dynes/cm. Combinations of these ranges are also possible (e.g., at least 5 and less than or equal to 25). Other ranges are also possible. In some preferred embodiments, the pore fluid selected for evaporative drying is ethoxynonafluorobutane (e.g., Novec 7200). In some embodiments, the solvent is evaporated at room temperature. In some preferred embodiments, the solvent is evaporated in an atmosphere of dry air (i.e., substantially water-free), nitrogen, and/or another substantially water-free inert gas. In other preferred embodiments, the pore fluid selected for evaporative drying is carbon dioxide at a temperature below its critical temperature and pressure of approximately 31.1° C. and 72.8 atm (1071 psi). In one such embodiment, the gel is evaporatively dried from liquid carbon dioxide at a temperature of approximately 28° C. and a pressure of about 68.0 atm (1000 psi).

In some embodiments, aerogels may be fabricated from gels by sublimation of a frozen pore fluid rather than evaporation of liquid-phase pore fluid. The pore fluid may be suitably frozen and sublimated with little to no capillary force, resulting in an aerogel. That is, rather than removing the solvent via evaporation from a liquid state, the solvent is sublimated from a solid state (having been frozen), hence, minimizing capillary forces that may otherwise result via evaporation. In some embodiments, the sublimation of the frozen pore fluid is performed under vacuum, or partial vacuum conditions, e.g., lyophilization. In some embodiments, the sublimation of the frozen pore fluid is performed at atmospheric pressure. In some embodiments, the method includes providing a gel material having a solvent located within pores of the gel material, freezing the solvent within the pores of the gel material, and sublimating the solvent at ambient conditions to remove the solvent from the pores of the gel material to produce an aerogel material. In some embodiments, the sublimation of the solvent is performed in dry (i.e., substantially water-free) air, nitrogen, and/or another substantially water-free inert gas. In a further preferred embodiment, the pore fluid selected for this process is tert-butanol.

Aerogels can be made of a variety of materials and can exhibit a number of geometries. Generally speaking, aerogels are dry, highly porous, solid-phase materials that may exhibit a diverse array of extreme and valuable materials properties, e.g., low density, low thermal conductivity, high density-normalized strength and stiffness, and/or high specific internal surface area. In some embodiments, the pores within an aerogel material are less than about 100 nm in diameter, while in some preferred embodiments, the diameter of the pores within an aerogel material fall between about 2-50 nm in diameter, i.e., the aerogel is mesoporous. In some embodiments, aerogels may contain pores with diameters greater than about 100 nm, and in some embodiments, aerogels may even contain pores with diameters of several microns. In some embodiments, at least 50%, at least 60%, at least 70%, at least 80%, at least 90%, at least 95%, at least 99%, or more of the pore volume is made up of pores having diameters of less than 100 nm. In some embodiments, at least 50%, at least 60%, at least 70%, at least 80%, at least 90%, at least 95%, at least 99%, or more of the pore volume is made up of pores having diameters of less than 50 nm. In some preferred embodiments, at least 50%, at least 60%, at least 70%, at least 80%, at least 90%, at least 95%, at least 99%, or more of the pore volume is made up of pores having diameters of less than 25 nm. In some embodiments, an aerogel may contain a monomodal distribution of pores, a bimodal distribution of pores, or a polymodal distribution of pores. Suitable aerogel material compositions may include, for example, silica, metal and/or metalloid oxides, metal chalcogenides, metals and/or metalloids, metal and/or metalloid carbides, metal and/or metalloid nitrides, organic polymers, biopolymers, amorphous carbon, graphitic carbon, diamond, and discrete nanoscale objects such as carbon nanotubes, boron nitride nanotubes, viruses, semiconducting quantum dots, graphene, 2D boron nitride, or combinations thereof.

In some embodiments, the aerogel comprises polyurea, a polyurethane, a polyisocyanate, a polyisocyanurate, a polyimide, a polyamide, a poly(imide-amide), a polyacrylonitrile, a polycyclopentadiene, a polybenzoxazine, a polybenzazazine, a polyacrylamide, a polynorbornene, a poly (ethylene terephthalate), a poly(ether ether ketone), a poly (ether ketone ketone), a phenolic polymer, a resorcinol-formaldehyde polymer, a melamine-formaldehyde polymer, a resorcinol-melamine-formaldehyde polymer, a furfural-formaldehyde polymer, a resole, a novolac, an acetic-acid-based polymer, a polymer-crosslinked oxide, a silica-polysaccharide polymer, a silica-pectin polymer, a polysaccharide, a glycoprotein, a proteoglycan, collagen, a protein, a polypeptide, a nucleic acid, amorphous carbon, graphitic carbon, graphene, diamond, a carbon nanotube, boron nitride, a boron nitride nanotube, two-dimensional boron nitride, an alginate, a chitin, a chitosan, a pectin, a gelatin, a gelan, a gum, an agarose, an agar, a cellulose, a virus, a biopolymer, an ormosil, an organic-inorganic hybrid material, a rubber, a polybutadiene, a poly(methyl pentene), a polyester, a polyether ether ketone, a polyether ketone ketone, a polypentene, a polybutene, a polytetrafluoroethylene, a polyethylene, a polypropylene, a polyolefin, a metal nanoparticle, a metalloid nanoparticle, a metal chalcogenide, a metalloid chalcogenide, a metal, a metalloid, a metal carbide, a metalloid carbide, a metal nitride, a metalloid nitride, a metal silicide, a metalloid silicide, a metal phosphide, a metalloid phosphide, a phosphorous-containing organic polymer, and/or a carbonizable polymer.

In some embodiments, polymer aerogels comprising an organic polymer may provide certain advantages over more commercially widespread inorganic aerogels such as silica aerogels. For example, silica aerogels often exhibit low fracture toughness and are accordingly brittle and friable. As a result, most silica aerogel materials are generally considered unsuitable for use as structural elements. In some embodiments, polymer aerogels comprising an organic polymer may exhibit improved strength, stiffness, and toughness properties over silica aerogels and thus may be used in lightweight structural elements as an alternative to traditional plastics or fiber-reinforced composites, which are much denser in comparison.

In some embodiments, a polyimide gel suitable for production of a polyimide aerogel is prepared from the reaction of one or more amines with one or more anhydrides. In some embodiments, an amine may be a monoamine, a diamine, or a polyamine. In some embodiments, an anhydride may be a monoanhydride, a dianhydride, or a polyanhydride. In some embodiments, the amine and anhydride react to form a poly(amic acid) that is then imidized to form a polyimide. In certain embodiments, the poly(amic acid) is chemically imidized. In some embodiments, the poly(amic acid) is thermally imidized.

In some embodiments, biphenyl-3,3',4,4'-tetracarboxylic dianhydride (BPDA), 2,2'-dimethylbenzidine (DMBZ), and 4,4'-oxydianiline (4,4-ODA or ODA), are combined to form anhydride end-capped poly(amic acid) oligomers wherein the oligomer comprises a repeating unit of the reaction product of BPDA, ODA, and DMBZ, for example, a unit comprising the reaction product of BPDA-ODA-BPDA-DMBZ, and comprises terminal anhydride and/or amine groups, the oligomers having an average degree of polymerization of 10 to 50. In some embodiments, the oligomers are crosslinked via a crosslinking agent, also known as a crosslinker. In some embodiments, the crosslinking agent comprises three or more amine groups. In some embodiments, the crosslinking agent comprises a functional group that reacts with a terminal group on the oligomers to produce a crosslinking-agent-terminated oligomer. In some embodiments, the crosslinking agent comprises functional groups that react with another crosslinking agent molecule to connect crosslinking-agent-terminated oligomers together. In some embodiments, the crosslinking agent is introduced at a balanced stoichiometry of a functional group on the crosslinking agent that is reactive towards a terminal group on the polyimide oligomer to the complementary terminal groups on the polyimide oligomers. In some embodiments, two or more oligomers are attached to the same crosslinking agent. In some embodiments, the resulting network is chemically imidized to yield a porous crosslinked polyimide network. In some embodiments, the oligomers are imidized prior to crosslinking. In some embodiments, the oligomers are imidized concurrently with crosslinking.

In some preferred embodiments, a polymer aerogel comprises a three-dimensional network of organic polymer comprising monomers and/or crosslinks of functionality three or greater, e.g., it comprises the reaction product of a crosslinking agent and three or more oligomers and/or the reaction product of a monomer with three or more other monomers. In some preferred embodiments, a polymer network comprising trifunctional or higher functionality monomers and/or crosslinking agents provides for an aerogel with suitable strength, stiffness, and toughness properties for use as a structural material. In some embodiments, the strength, stiffness, and toughness properties of the aerogel are suitable for production of aerogel parts with large, e.g., greater than about 30 cm, dimensions. As would be understood by those of ordinary skill in the art, the length of a particular dimension of an aerogel corresponds to the distance between the exterior boundaries of the aerogel along that dimension. As also would be understood by those of ordinary skill in the art, when measuring three dimensions of an aerogel, each dimension would be perpendicular to the other two (such that the second dimension would be perpendicular to the first dimension, and the third dimension would be perpendicular to the first and second dimensions).

In some embodiments, a polyimide gel, from which a polyimide aerogel can be made, is derived from the reaction of one or more amines with one or more anhydrides. In some embodiments, the amine and anhydride react to form a poly(amic acid) that is then imidized to form a polyimide. In certain embodiments, the poly(amic acid) is chemically imidized. In some embodiments, the poly(amic acid) is thermally imidized.

In some preferred embodiments, biphenyl-3,3',4,4'-tetracarboxylic dianhydride (BPDA), 2,2'-dimethylbenzidine (DMBZ), and 4,4'-oxydianiline (4,4-ODA or ODA), are combined to form anhydride end-capped poly(amic acid) oligomers wherein the oligomer comprises a repeating unit of order BPDA, ODA, BPDA and DMBZ with terminal anhydride groups, the oligomers having an average degree of polymerization (number or repeat units) of 10 to 50. The oligomers are, in some such embodiments, crosslinked via a crosslinking agent, comprising three or more amine groups, at a balanced stoichiometry of the amine groups to the terminal anhydride groups, and chemically imidized via the addition of acetic anhydride (AA) to yield the porous, highly crosslinked polyimide network.

In some embodiments, a polyimide gel is derived from the reaction of one or more anhydrides with one or more isocyanates. In some embodiments, the anhydride comprises a dianhydride. In some embodiments, the isocyanate comprises a diisocyanate, a triisocyanate, tris(isocyanatophenyl) methane, a toluene diisocyanate trimer, and/or methylenediphenyl diisocyanate trimer. In some embodiments, the anhydride and isocyanate are contacted in a suitable solvent.

In some embodiments, the isocyanate comprises a triisocyanate; an aliphatic triisocyanate; an aromatic isocyanate comprising three or more isocyanate groups; an aromatic triisocyanate; a triisocyanate based on hexamethylene diisocyanate; the trimer of hexamethylenediisocyanate; hexamethylenediisocyanate; a triisocyanate comprising isocyanurate; a diisocyanate comprising isocyanurate; Desmodur® N3200; Desmodur N3300; Desmodur N100; Desmodur N3400; Desmodur N3390; Desmodur N3390 BA/SN; Desmodur N3300 BA; Desmodur N3600; Desmodur N3790 BA; Desmodur N3800; Desmodur N3900; Desmodur XP 2675; Desmodurblulogiq 3190; Desmodur XP 2860; Desmodur N3400; Desmodur XP 2840; Desmodur N3580 BA; Desmodur N3500; Desmodur RE; tris(isocyanatophenyl) methane; Desmodur RC; Mondur® MR; Mondur MRS; a methylene diphenyl diisocyanate; diphenylmethane 2,2'-, 2,4'- and/or 4,4'-diisocyanate (MDI); naphthylene 1,5-diisocyanate (NDI); a toluene diisocyanate; toluene 2,4- and/or 2,6-diisocyanate (TDI); 3,3'-dimethylbiphenyl diisocyanate; 1,2-diphenylethane diisocyanate and/or p-phenylenediisocyanate (PPDI); trimethylene, tetramethylene, pentamethylene, hexamethylene, heptamethylene and/or octamethylenediisocyanate; 2-methylpentamethylene 1,5-diisocyanate; 2-ethylbutylene 1,4-diisocyanate; pentamethylene 1,5-diisocyanate; butylene 1,4-diisocyanate; 1-isocyanato-3,3,5- trimethyl-5-isocyanatomethylcyclohexane (isophoronediisocyanate, IPDI); 1,4- and/or 1,3-bis(isocyanatomethyl) cyclohexane (HXDI); cyclohexane 1,4-diisocyanate; 1-methylcyclohexane 2,4-diisocyanate; 1-methylcyclohexane 2,6-diisocyanate; dicyclohexylmethane 4,4'-diisocyanate; dicyclohexylmethane 2,4'-diisocyanate; and/or dicyclohexylmethane 2,2'-diisocyanate.

In some embodiments, the anhydride comprises an aromatic dianhydride; an aromatic trianhydride; an aromatic tetraanhydride; an aromatic anhydride having between 6 and about 24 carbon atoms and between 1 and about 4 aromatic rings which may be fused, coupled by biaryl bonds, or linked by one or more linking groups selected from C1-6 alkylene, oxygen, sulfur, keto, sulfoxide, sulfone and the like; biphenyl-3,3',4,4'-tetracarboxylic dianhydride (BPDA); 3,3',4,4'-biphenyl tetracarboxylicdianhydride; 2,3,3',4'-biphenyl tetracarboxylic acid dianhydride (a-BPDA); 2,2',3,3'-biphenyl tetracarboxylicdianhydride; 3,3',4,4'-benzophenone-tetracarboxylic dianhydride; benzophenone-3,3',4,4'-tetracarboxylic dianhydride (BTDA); pyromelliticdianhydride; 4,4'-hexafluoro isopropylidenebisphthalicdianhydride (6FDA); 4,4'-(4,4'-isopropylidene diphenoxy)-bis(phthalic anhydride); 4,4'-oxydiphthalic anhydride (ODPA); 4,4'-oxydiphthalic dianhydride; 3,3',4,4'-diphenylsulfonetetracarboxylicdianhydride (DSDA); hydroquinone dianhydride; hydroquinone diphthalic anhydride (HQDEA); 4,4'-bisphenol A dianhydride (BPADA); ethylene glycol bis(trimellitic anhydride) (TMEG); 2,2-bis(3,4-dicarboxyphenyl)propanedianhydride; bis(3,4-dicarboxyphenyl)sulfoxide dianhydride; poly(siloxane-containing dianhydride); 2,3,2',3'-benzophenone tetracarboxylicdianhydride; 3,3',4,4'-benzophenone tetracarboxylic dianhydride; naphthalene-2,3,6,7-tetracarboxylic dianhydride; naphthalene-1,4,5,8-tetracarboxylic dianhydride; 3,3',4,4'-biphenylsulfone tetracarboxylicdianhydride; 3,4,9,10-perylene tetracarboxylicdianhydride; bis(3,4-dicarboxyphenyl)sulfide dianhydride; bis(3,4-dicarboxyphenyl)methane dianhydride; 2,2-bis(3,4-dicarboxyphenyl)propane dianhydride; 2,2-bis(3,4-dicarboxyphenyl)hexafluoropropene; 2,6-dichloro naphthalene 1,4,5,8-tetracarboxylic dianhydride; 2,7-dichloronaphthalene-1,4,5,8-tetracarboxylic dianhydride; 2,3,6,7-tetrachloronaphthalene-1,4,5,8-tetracarboxylic dianhydride; phenanthrene-8,9,10-tetracarboxylic dianhydride; pyrazine-2,3,5,6-tetracarboxylic dianhydride; benzene-1,2,3,4-tetracarboxylic dianhydride; and/or thiophene-2,3,4,5-tetracarboxylic dianhydride. In some preferred embodiments the dianhydride comprises biphenyl-3,3',4,4'-tetracarboxylic dianhydride (BPDA).

In some embodiments, a polyimide gel is derived from the reaction of an amine with an anhydride. In some embodiments, the reaction of amine and anhydride forms poly(amic acid) oligomers. In some embodiments the poly(amic acid) oligomers are chemically imidized to yield polyimide oligomers. In some embodiments chemical imidization is achieved by contacting the poly(amic acid) oligomer with a dehydrating agent. In some embodiments the dehydrating agent comprises acetic anhydride, propionic anhydride, n-butyric anhydride, benzoic anhydride, trifluoroacetic anhydride, phosphorous trichloride, and/or dicyclohexylcarbodiimide. In some embodiments chemical imidization is catalyzed by contacting the solution comprised of poly(amic acid) oligomers and dehydrating agent(s) with an imidization catalyst.

In some embodiments, a polyimide gel is derived from the reaction of an amine with an anhydride. In some embodiments, the reaction of amine and anhydride forms poly(amic acid) oligomers. In some embodiments the poly(amic acid) oligomers are thermally imidized to yield polyimide oligomers. In some embodiments, the poly(amic acid) oligomers are heated to a temperature of greater than about 80° C., greater than about 90° C., greater than about 100° C., greater than about 150° C., greater than about 180° C., greater than about 190° C., or any suitable temperature.

In some embodiments, the diamine and/or dianhydride may be selected based on commercial availability and/or price. In some embodiments, the diamine and/or dianhydride may be selected based on desired material properties. In some embodiments, a specific diamine and/or dianhydride may impart specific properties to the polymer. For example, in some embodiments, diamines and/or dianhydrides with flexible linking groups between phenyl groups can be used to make polyimide aerogels with increased flexibility. In some embodiments, diamines and/or dianhydrides comprising pendant methyl groups can be used to make polyimide aerogels with increased hydrophobicity. In other embodiments, diamines and/or dianhydrides comprising fluorinated moieties such as trifluoromethyl can be used to make polyimide aerogels with increased hydrophobicity.

In some embodiments, two or more diamines and/or two or more dianhydrides are used. In an illustrative embodiment, two diamines are used. The mole percent of the first diamine relative to the total of the two diamines can be varied from about 0% to about 100%. The mole percent of the first diamine relative to the total of the two diamines comprises, in some embodiments, less than about 99.9%, less than about 90%, less than about 80%, less than about 70%, less than about 60%, less than about 50%, less than about 40%, less than about 30%, less than about 20%, less than about 10%, less than about 0.1%, or less. In further embodiments, wherein more than two diamines are used, the mole percent of each diamine relative to the total diamines can be varied from about 0.1% to about 99.9%. In a further illustrative example, two dianhydrides are used. The mole percent of the first dianhydride relative to the total of the two dianhydride can be varied from about 0.1% to about 99.9%. In some embodiments, the mole percent of the first dianhydride relative to the total of the two dianhydrides comprises less than about 99.9%, less than about 90%, less than about 80%, less than about 70%, less than about 60%, less than about 50%, less than about 40%, less than about 30%, less than about 20%, less than about 10%, less than about 0.1%, or less. In further embodiments, wherein more than two dianhydrides are used, the mole percent of each dianhydride relative to the total dianhydride can be varied from about 0.1% to about 99.9%.

In some embodiments, multiple diamines are used. In some embodiments, the first diamine is added to the solvent, after which the dianhydride is then added. In some embodiments, each amino site on the diamine reacts with an anhydride site on different dianhydrides, such that anhydride-terminated oligomers are formed. In some embodiments, a second diamine is then added to the solution. These diamines react with terminal anhydrides on the oligomers in solution, forming longer amino-terminated oligomers. Oligomers of varying lengths result from such a process, and that an alternating motif of first diamine, then dianhydride, then second diamine, results. Without wishing to be bound by any particular theory, it is believed that this approach encourages spatial homogeneity of properties throughout the gel network, where simply mixing all monomers together simultaneously and allowing dianhydrides and diamines to react with other simultaneously at random may lead to phase segregation of domains rich in one particular diamine and/or spatial heterogeneity.

In some embodiments, the weight, i.e., mass, percent polymer in solution is controlled during polyimide gel synthesis. The term weight percent polymer in solution refers to the weight of monomers in solution minus the weight of byproducts resulting from condensation reactions among the monomers, relative to the weight of the solution. The weight percent polymer in solution can be less than about 1%, less than about 2%, less than about 3%, less than about 4%, less than about 5%, less than about 6%, less than about 7%, less than about 8%, less than about 9%, less than about 10%, less than about 12%, less than about 14%, less than about 16%, less than about 18%, less than about 20%, and/or between 20% and 30%. In some preferred embodiments, the weight percent polymer is between 5% and 15%.

In some embodiments, the reaction of diamine and dianhydride produces an oligomer comprising a repeating unit of at least a diamine and a dianhydride. In some embodiments, the oligomer comprises about 1 repeat unit, less than about 2 repeat units, less than about 5 repeat units, less than about 10 repeat units, less than about 20 repeat units, less than about 30 repeat units, less than about 40 repeat units, less than about 50 repeat units, less than about 60 repeat units, less than about 80 repeat units, less than about 100 repeat units, or less than about 200 repeat units. In some embodiments, the oligomer has an average degree of polymerization of less than about 10, less than about 20, less than about 30, less than about 40, less than about 60, less than about 80, or less than about 100. In some embodiments, the oligomer comprises terminal anhydride groups, i.e., both ends of the oligomer comprise a terminal anhydride group. In some embodiments, the oligomer comprises terminal amine groups, i.e., both ends of the oligomer comprise a terminal amine group.

In certain embodiments, an aerogel may pass a vertical burn test based on the procedures described in section 25.853 of the United States Federal Aviation Regulations (FAR) burn requirements for aviation interiors. The vertical burn test described in FAR 25.853 Appendix F, section (4) "Vertical Burn" was followed as written with some exceptions. The typical procedure including exceptions is as described subsequently. The sample used for the test was approximately 2.5" in width by 3.5" in height by 0.25" in thickness. The sample was prepared by conditioning at ambient temperature and relative humidity, estimated to be approximately 50% relative humidity and 70° F. (21.1° C.). The flame source was a Bunsen burner using propane fuel, adjusted to approximately 1.5" flame height. The temperature of the flame was not measured, but was the sample was hung with the shorter 2.5" edge about 0.75" from the top of the Bunsen burner, such that the 3.5" edge was vertical, i.e. perpendicular to the force of gravity. The flame was applied to the sample for a period of approximately 1 minute, and then removed. The samples tested self-extinguished in less than about 1 second after removal of the flame. The aerogel samples in fact did not appear to substantially burn or sustain flame at any point, but rather charred in the presence of the flame.

In some embodiments, a screening test in which aerogel materials are annealed at 200° C. may be performed. This temperature is indicative of the upper end of the operating temperature range for many high-temperature applications, e.g., engine cover applications. This temperature is also a point at which native polymer aerogels, e.g., polyimide aerogels, often begin to show obvious dimensional change due to temperature. In some embodiments, an aerogel at 25° C. at 1 atm in air is transferred into an evenly-heated oven at 200° C. with 1 atm of air. After annealing at 200° C. in an oven for 60 min, the sample may be removed and then measured for dimensional changes and optionally photographed.

In some embodiments, an aerogel exhibits low flammability upon contact with flame. In some embodiments, when subjected to a vertical burn test above a Bunsen burner burning propane, an aerogel is nonflammable.

In accordance with embodiments, aerogels exhibit ease of production and are cost-effective to produce. For example, samples of an aerogel with dimensions of 3.5"×15"×0.5" containing intricate features have been produced through both CNC milling and direct molding with a polydimethylsiloxane (PDMS) mold. Both material samples showed very high feature resolution and validated the ease of machining and molding this material to shape, noting that molding may be a cost effective way to produce complex parts from this material in large quantities.

As used herein, the "maximum operating temperature" is given its ordinary meaning in the art, and refers to the temperature above which the article undergoes substantial chemical and/or mechanical degradation. Examples of chemical degradation include denaturing, decomposition, phase change, and ignition. Examples of mechanical degradation include mechanical warping, falling apart, and the like.

In some embodiments, the maximum operating temperature refers to the temperature above which the article falls apart.

In some embodiments, the maximum operating temperature refers to the temperature above which the article fails to retain its structural integrity.

In some embodiments, the maximum operating temperature refers to the temperature above which the article ignites (i.e., catches on fire) in air.

In some embodiments, the maximum operating temperature refers to the temperature above which the article changes phase (e.g., melts, evaporates, and/or sublimates).

In some embodiments, the maximum operating temperature refers to the temperature above which the article continues to lose mass even once reaching thermal equilibrium.

In some embodiments, the aerogel has a maximum operating temperature is greater than about 100° C., greater than about 200° C., greater than about 250° C., greater than about 300° C., greater than about 325° C., or greater than about 350° C.

In some embodiments, an aerogel has desirable materials properties for engineering applications. In some embodiments, an aerogel with an operating temperature greater than about 100° C., greater than about 200° C., greater than about 250° C., greater than about 300° C., greater than about 325° C., and/or greater than about 350° C., can be produced. In some embodiments, the aerogel does not ignite in air at any temperature below 100° C., at any temperature below 200° C., at any temperature below 250° C., at any temperature below 300° C., at any temperature below 325° C., or at any temperature below 350° C. In some embodiments, for at least one dimension of the aerogel, the dimension does not change by more than 20%, by more than 10%, by more than 5%, or by more than 2% at any temperature below 100° C., at any temperature below 200° C., at any temperature below 250° C., at any temperature below 300° C., at any temperature below 325° C., or at any temperature below 350° C. In some embodiments, the dimensions of the aerogel after exposure to temperatures of about 200° C. fall within about 50%, within about 30%, within about 20%, or within about 10% of the dimensions of the aerogel prior to exposure to said temperatures. In some embodiments, the dimension of the aerogel after exposure to temperatures of about 250° C. fall within about 80%, within about 50%, within about 30%, or within about 10% of the dimensions of the aerogel prior to exposure to said temperatures. In some embodiments, the dimensions of the aerogel after exposure to temperatures of about 300° C. fall within about 80%, within about 50%, within about 30%, or within about 10% of the dimensions of the aerogel prior to exposure to said temperatures. In some embodiments, the dimensions of the aerogel after exposure to temperatures about 350° C. fall within about 80%, within about 50%, within about 30%, or within about 10% of the dimensions of the aerogel prior to exposure to said temperatures. In some embodiments, when exposed to the maximum operating temperature for the first time, the aerogel undergoes irreversible one-time linear shrinkage of less than about 20%, less than about 15%, less than about 10%, or less than about 5%. In some embodiments, the aerogel undergoes irreversible one-time linear shrinkage of less than about 20%, less than about 15%, less than about 10%, or less than about 5% when exposed to flame. In some embodiments, the surface area of the aerogel is greater than about 10 $m^2/g$, greater than about 20 $m^2/g$, greater than about 40 $m^2/g$, greater than about 60 $m^2/g$ greater than about 80 $m^2/g$, greater than about 100 $m^2/g$, greater than about 150 $m^2/g$, greater than about 200 $m^2/g$, greater than about 250 $m^2/g$, greater than about 300 $m^2/g$, greater than about 350 $m^2/g$, greater than about 400 $m^2/g$, greater than about 600 $m^2/g$, or greater than about 800 $m^2/g$. In some embodiments, after exposure to its maximum operating temperature the surface area of the aerogel is greater than about 10 $m^2/g$, greater than about 20 $m^2/g$, greater than about 40 $m^2/g$, greater than about 60 $m^2/g$ greater than about 80 $m^2/g$, greater than about 100 $m^2/g$, greater than about 150 $m^2/g$, greater than about 200 $m^2/g$, greater than about 250 $m^2/g$, greater than about 300 $m^2/g$, greater than about 350 $m^2/g$, greater than about 400 $m^2/g$, or greater than about 600 $m^2/g$, greater than about 800 $m^2/g$. In some embodiments, the flatness of the monolithic aerogel changes less than about 1%, less than about 2%, less than about 3%, less than about 4%, less than about 5%, less than about 6%, less than about 7%, less than about 8%, less than about 9%, or less than about 10% relative to its flatness when exposed to the maximum operating temperature. In some embodiments, the flatness of the monolithic aerogel changes less than about 1%, less than about 2%, less than about 3%, less than about 4%, less than about 5%, less than about 6%, less than about 7%, less than about 8%, less than about 9%, or less than about 10% relative to its initial flatness, when exposed to the maximum operating temperature. In some embodiments, the thickness of the monolithic aerogel changes less than about 1%, less than about 2%, less than about 3%, less than about 4%, less than about 5%, less than about 6%, less than about 7%, less than about 8%, less than about 9%, or less than about 10% relative to its initial thickness, when exposed to the maximum operating temperature. In some embodiments, aerogel exhibits low thermal conductivities at room temperature and/or temperatures above room temperature. In some embodiments, the thermal conductivity of the polymer aerogel is less than about 150 mW/m-K, less than about 100 mW/m-K, less than about 90 mW/m-K, less than about 80 mW/m-K, less than about 70 mW/m-K, less than about 60 mW/m-K, less than about 50 mW/-K, less than about 40 mW/m-K, less than about 30 mW/m-K, or less than about 20 mW/m-K at room temperature.

In some embodiments, the aerogel can undergo flexural strain of greater than 1%, greater than 5%, greater than 10%, greater than 20%, greater than 30%, greater than 40%, greater than 50%, greater than 60%, greater than 70%, or greater than 80% without fracture.

In some embodiments, a method for making an aerogel comprises providing a solvent (e.g., any of the solvents described elsewhere herein), adding a first diamine (e.g., any of the diamines described elsewhere herein) to the solvent, adding a first amount of a dianhydride (e.g., any of the dianhydrides described elsewhere herein) to the solvent after adding the first diamine, adding a second diamine (e.g., any of the diamines described elsewhere herein) to the solvent after adding the first amount of dianhydride, adding a second amount of a dianhydride (e.g., any of the dianhydrides described elsewhere herein) to the solvent after adding the second diamine, adding a third diamine to the solvent after adding the second amount of dianhydride, adding a crosslinker (e.g., any of the crosslinkers and/or crosslinking agents described herein) to the solvent, adding a catalyst (e.g., any of the catalysts described herein) to the solvent, and adding a water scavenger (e.g., any of the water scavengers described herein) to the solvent to form a gel comprising poly(amic acid) and/or polyimide, optionally replacing at least a portion of the liquid in the resulting gel with a second liquid (e.g., and of the solvents and/or pore fluids described herein), and then removing at least a portion of the liquid from the gel (e.g., using any of the suitable drying methods described herein) to form an aerogel.

FIG. 1A depicts a hydrophobic polyimide moiety, according to certain embodiments.

FIG. 1B depicts magnified views of the hydrophobic polyimide moiety shown in FIG. 1A, in accordance with certain embodiments. The left-hand side of the moiety in FIG. 1A is shown in magnified view at the top of FIG. 1B, and the right-hand side of the moiety in FIG. 1A is shown in magnified view at the bottom of FIG. 1B.

Figure 2:
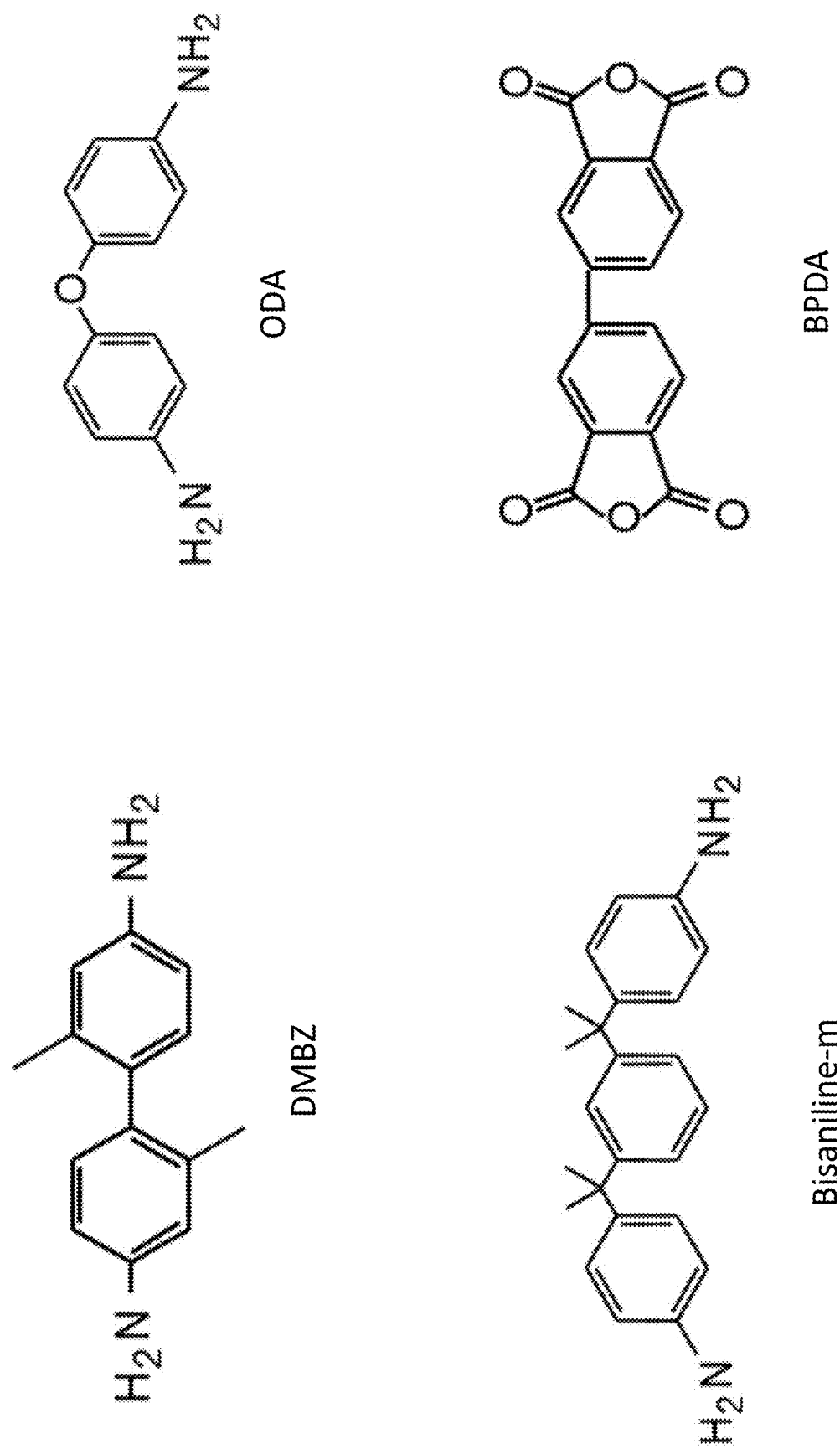
FIG. 2 depicts the molecular structures of several monomers, according to certain embodiments.

FIG. 2 depicts the molecular structures of several monomers, according to certain embodiments. According to certain embodiments, a moiety is created by reacting one or more of these monomers. In some embodiments the reaction takes place in a solvent. In some embodiments, the reaction takes place in the presence of a catalyst. In some embodiments, the reaction takes place in the presence of a water scavenger. According to certain embodiments, the moiety created is a moiety [M1] as shown in FIG. 1A.

Figure 3:
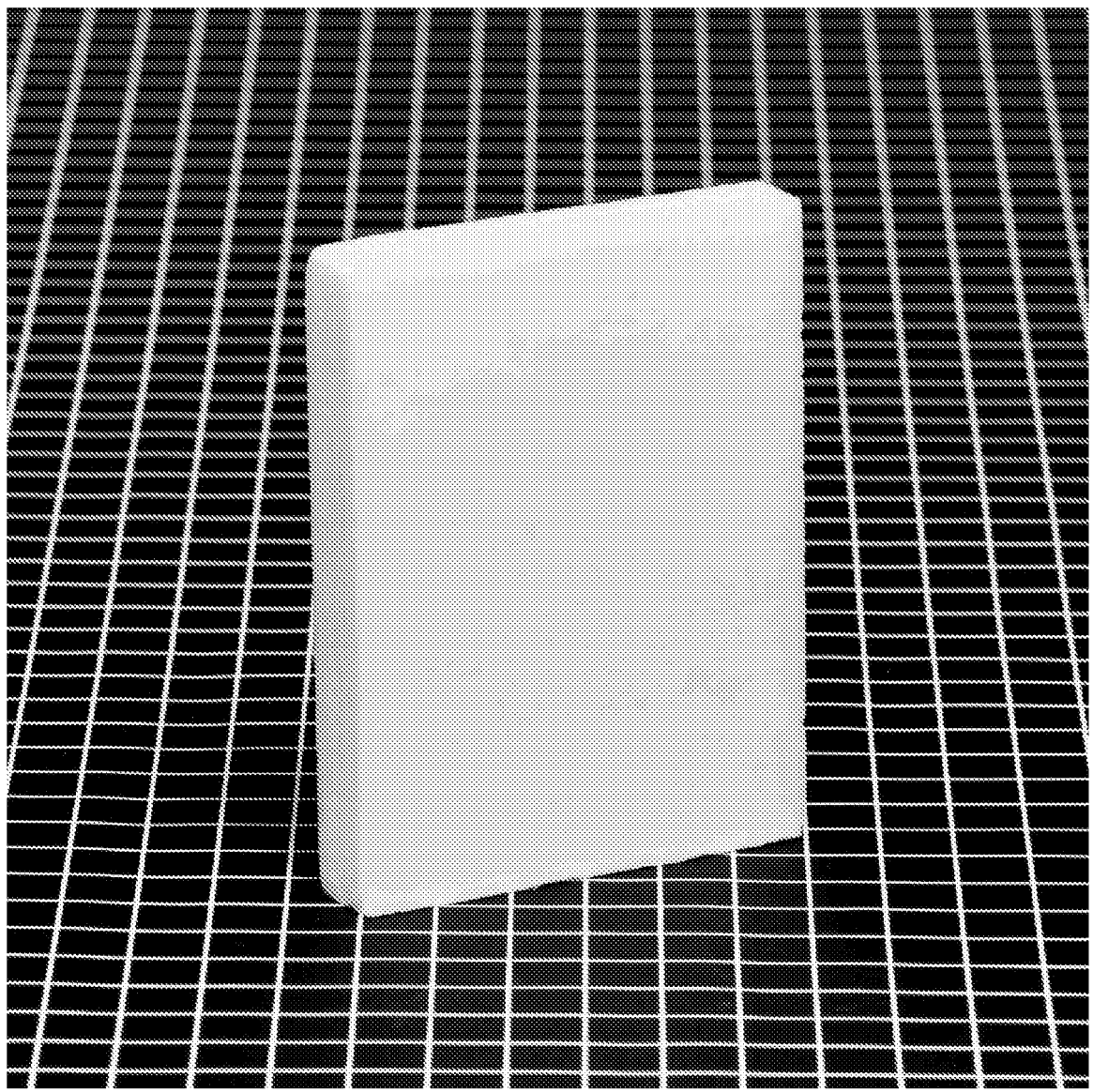
FIG. 3 is an image of a polyimide aerogel, according to certain embodiments.

FIG. 3 is an image of a polyimide aerogel, according to certain embodiments. The aerogel is the polyimide aerogel described in Example 1.

Figure 4:
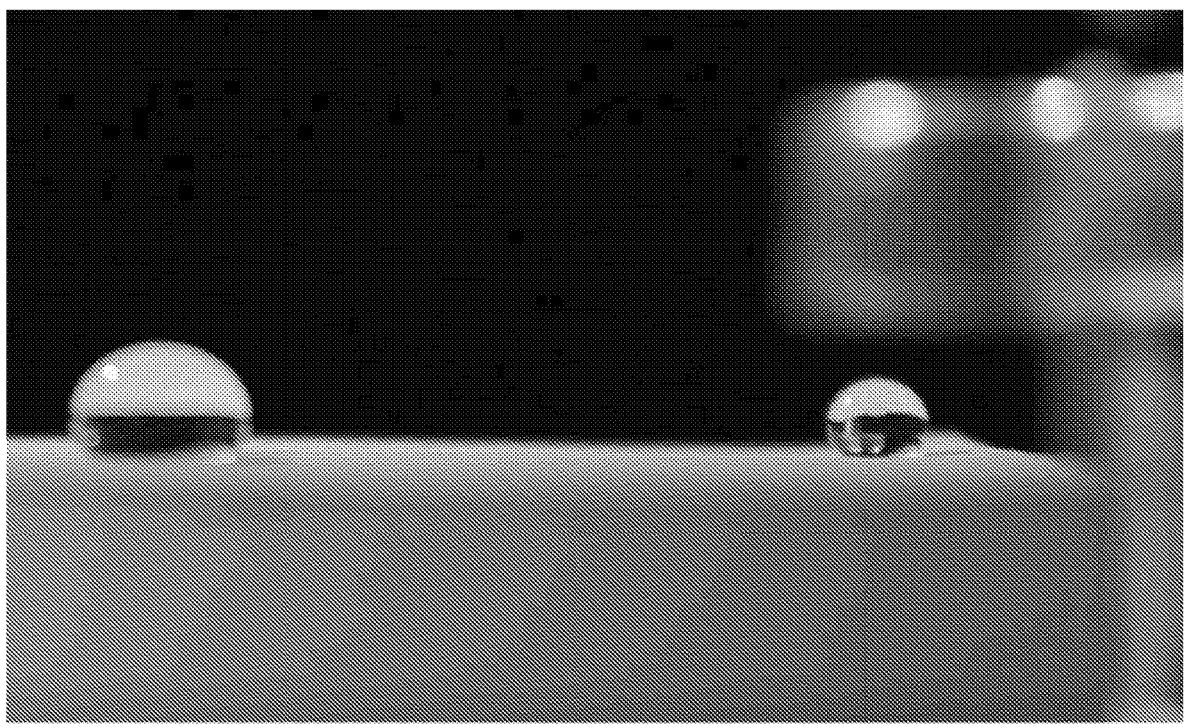
FIG. 4 is an image of water droplets on the surface a polyimide aerogel that may exhibit hydrophobicity, according to certain embodiments.

FIG. 4 is an image of water droplets on the surface a polyimide aerogel that may exhibit hydrophobicity, according to certain embodiments. The aerogel is the polyimide aerogel described in Example 1.

Figure 5:
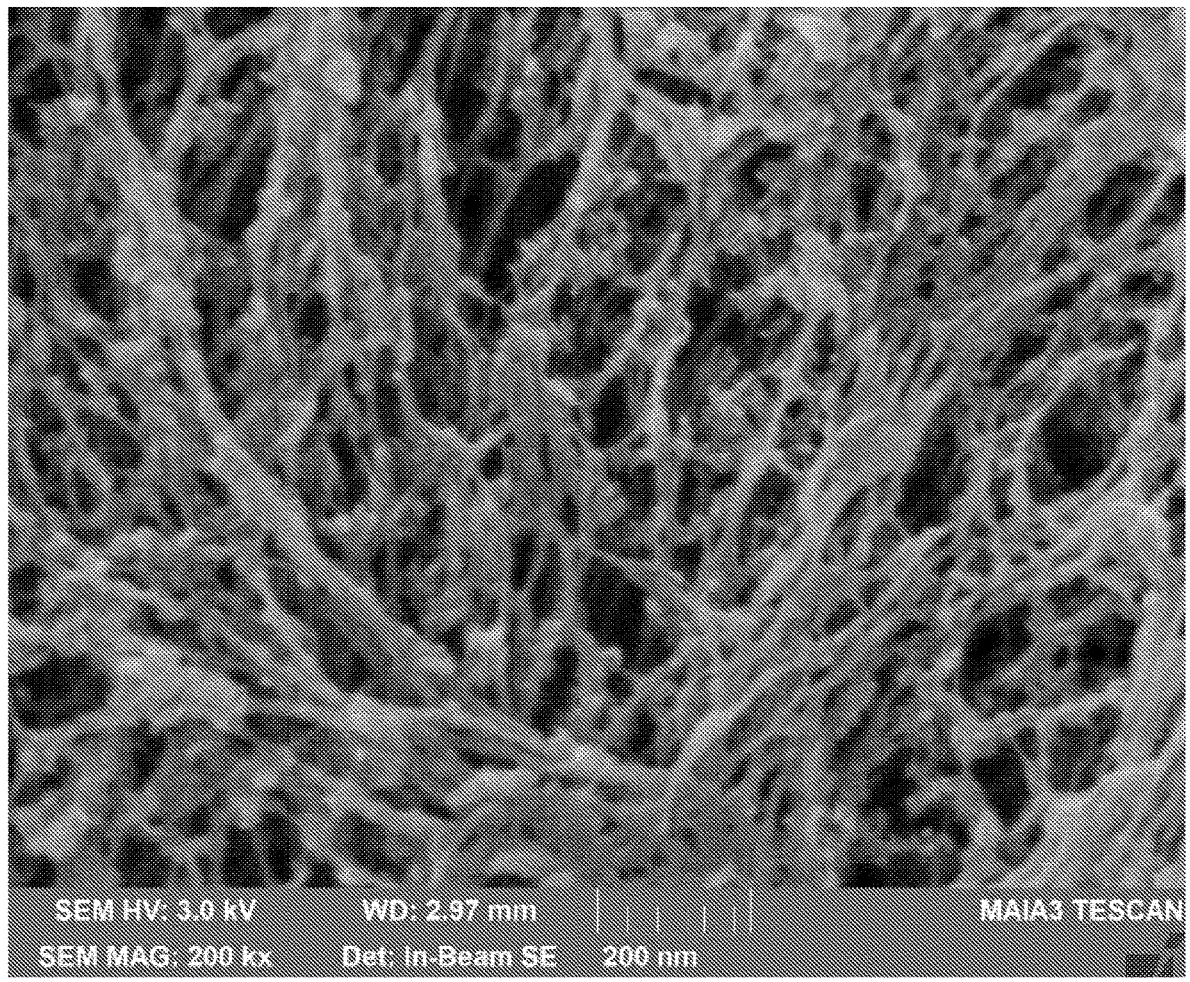
FIG. 5 is a scanning electron microscope (SEM) micrograph of a polyimide aerogel, according to certain embodiments.

FIG. 5 is an SEM micrograph of a polyimide aerogel, according to certain embodiments.

Figure 6A:
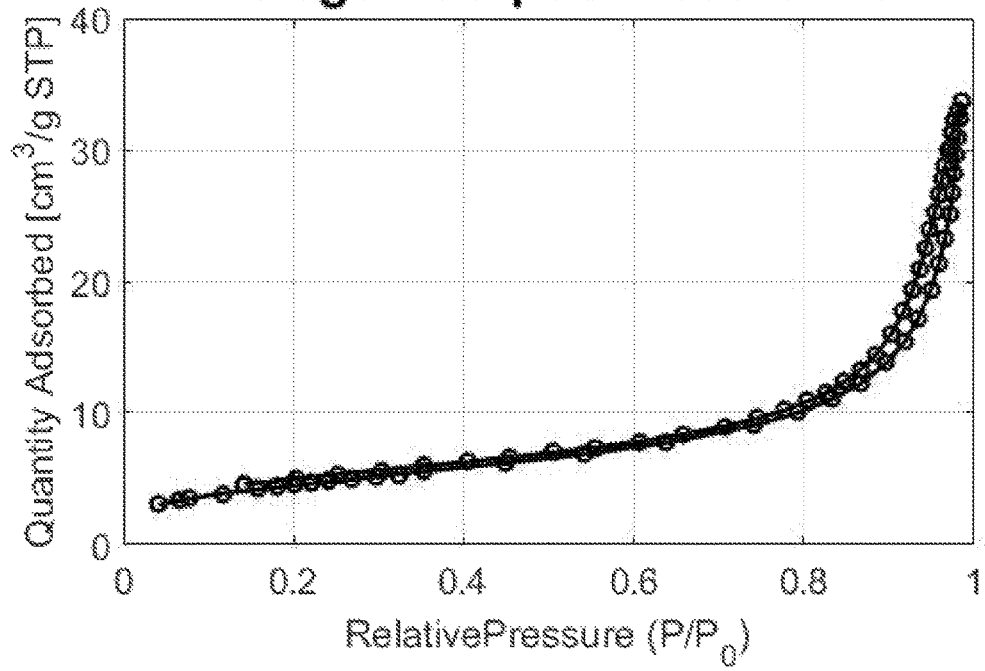
FIGS. 6A-6B are plots of (A) the nitrogen sorption isotherm and (B) pore size distribution data of a polyimide aerogel, according to certain embodiments.
Figure 6B:
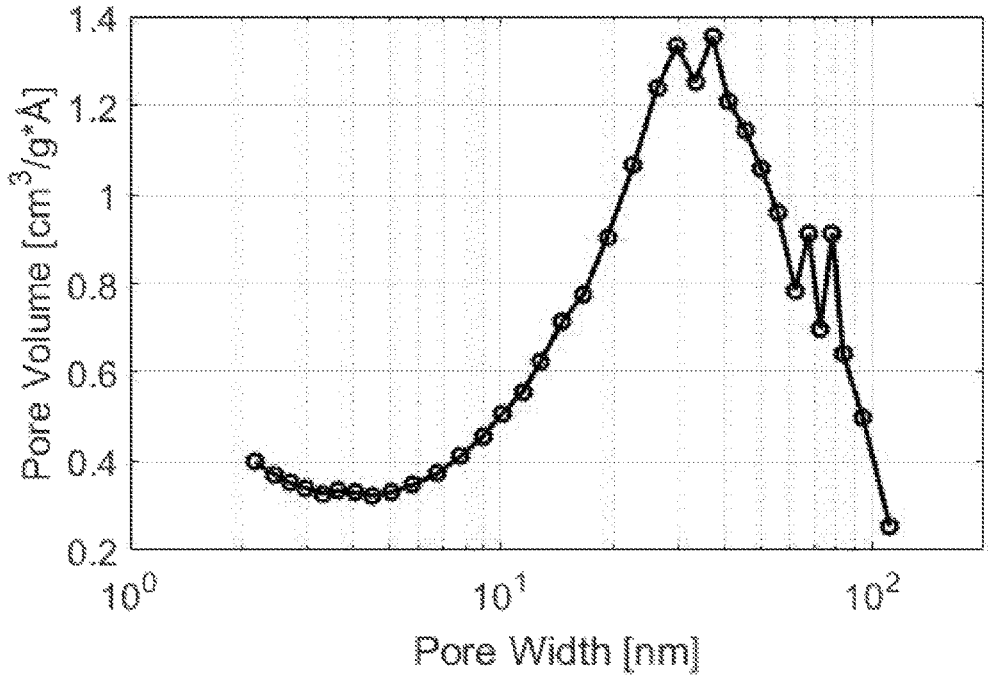

FIGS. 6A-6B are plots of the (A) nitrogen sorption isotherm and (B) pore size distribution data of a polyimide aerogel, according to certain embodiments. The aerogel is the polyimide aerogel described in Example 4.

Figure 7:
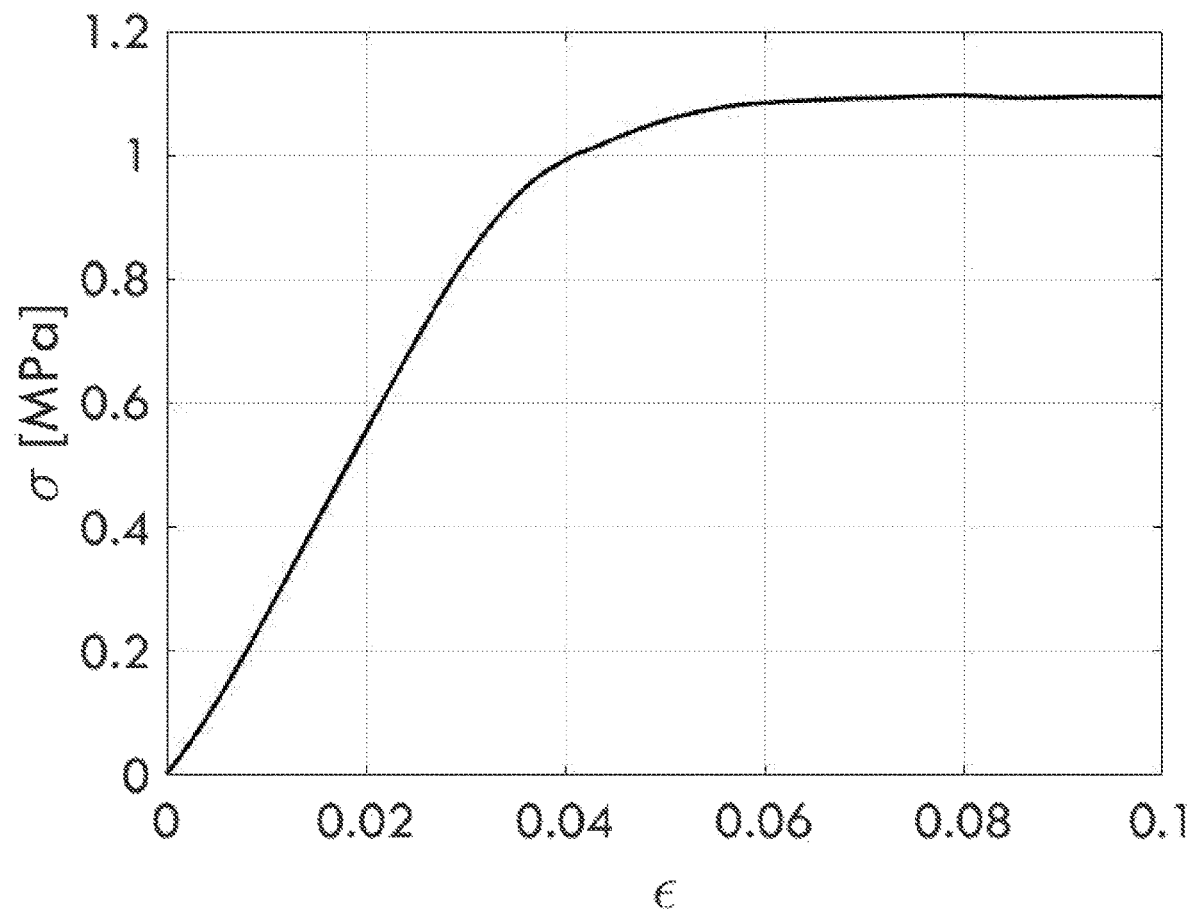
FIG. 7 is a plot of the stress vs. strain curve for a polyimide aerogel in compression, according to certain embodiments

FIG. 7 is a plot of the stress vs. strain curve for a polyimide aerogel in compression, according to certain embodiments. The aerogel is the polyimide aerogel described in Example 4.

U.S. Provisional Patent Application No. 62/914,281, filed Oct. 11, 2019, and entitled "Hydrophobic Polyimide Aerogels" is incorporated herein by reference in its entirety for all purposes.

EXAMPLES

The following example is intended to illustrate certain embodiments of the present invention, but does not exemplify the full scope of the invention.

Example 1. Synthesis of a Polyimide Aerogel Produced from Reaction of Amines and an Anhydrides and a Triisocyanate Crosslinker Prepared Via Supercritical $CO_2$ Drying A polyimide gel was synthesized by reaction of an amine and an anhydride. 0.92 g 2,2'-dimethylbenzidine (DMBZ) was dissolved in 75.87 g N-methyl-2-pyrrolidone (NMP). After 10 minutes of stirring, 2.56 g of biphenyl-3,3',4,4'-tetracarboxylic dianhydride (BPDA) was added to this mixture, and stirred for 10 minutes. After 10 minutes of stirring, 2.99 g of 4,4'-[1,3-phenylenebis(1-methyl-ethylidene)] bisaniline (bisaniline-m) was added to this mixture, and stirred for 10 minutes. After 10 minutes of stirring, 2.56 g of BPDA was added to this mixture, and stirred for 10 minutes. After 10 minutes of stirring, 0.78 g of 4,4'-oxydianiline (ODA) was added to this mixture, and stirred for 10 minutes. After 10 minutes, a mixture of 0.15 g Desmodur N3300A and 8.43 g NMP was added to the first mixture, and stirred for 10 minutes. After 10 minutes of stirring 14.22 g acetic anhydride and 3.52 g triethylamine were added in rapid succession. The resulting sol was stirred for 2-5 minutes until well mixed, then poured into a mold. The mold was then closed and placed in an air-tight container, and left for 24 hours at room temperature. After 24 hours the gel was removed from its mold and transferred to a solvent exchange bath i.e., a sealed container partially filled with approximately 500 mL acetone. It remained submerged in acetone in the container for 72 hours, during which time the acetone was decanted and replaced with an equivalent volume of new acetone twice.

After solvent exchange was complete the gel was transferred to a pressure vessel and submerged in excess acetone. The pressure vessel was then sealed and liquid $CO_2$ was introduced into the pressure vessel. The $CO_2$-acetone mixture was drained periodically while simultaneously supplying fresh liquid $CO_2$ until all the acetone was removed. Then, the pressure vessel was isolated from the $CO_2$ supply while still filled with liquid CO2. The pressure vessel was heated until the internal temperature reached 54° C., during which time pressure increased. Pressure was regulated by actuation of a solenoid valve, and was not allowed to exceed 1400 psi. The $CO_2$ inside the vessel was at that time in the supercritical state, and was held at these conditions for three hours, at which point the pressure vessel was slowly vented isothermally, such that the supercritical fluid entered the gaseous state without forming a two-phase liquid-vapor system, until the pressure vessel returned to atmospheric pressure. The pressure vessel was finally cooled to room temperature before the aerogel composite was retrieved.

The resulting aerogel is shown in FIG. 3. It was a yellow monolith with a bulk density of 0.115 g/cc. The material had a compressive modulus of 8.02 MPa, compressive yield strength of 0.4 MPa, and thermal conductivity of 23.5 mW/m-K. It had a specific surface area of 380 $m^2/g$. When subjected to the liquid water uptake test described herein, the material exhibited a liquid water uptake of 14 wt %.

Example 2. Synthesis of a Polyimide Aerogel Produced from Reaction of an Amine and an Anhydride and a Triamine Crosslinker Prepared Via Supercritical $CO_2$ Drying A polyimide gel was synthesized by reaction of an amine and an anhydride. 0.92 g 2,2'-dimethylbenzidine (DMBZ) was dissolved in 75.87 g N-methyl-2-pyrrolidone (NMP). After 10 minutes of stirring, 2.56 g of biphenyl-3,3',4,4'-tetracarboxylic dianhydride (BPDA) was added to this mixture and stirred for 10 minutes. After 10 minutes of stirring, 2.99 g of 4,4'-[1,3-phenylenebis(1-methyl-ethylidene)] bisaniline (bisaniline-m) was added to this mixture and stirred for 10 minutes. After 10 minutes of stirring, 2.56 g of BPDA was added to this mixture and stirred for 10 minutes. After 10 minutes of stirring, 0.78 g of 4,4'-oxydianiline (ODA) was added to this mixture and stirred for 10 minutes. After 10 minutes, a mixture of 0.08 g Melamine and 8.43 g NMP was added to the first mixture and stirred for 10 minutes. After 10 minutes of stirring 14.22 g acetic anhydride and 3.52 g triethylamine were added in rapid succession. The resulting sol was stirred for 2-5 minutes until well mixed, then poured into a mold. The mold was then closed and placed in an air-tight container, and left for 24 hours at room temperature. After 24 hours the gel was removed from its mold and transferred to a solvent exchange bath i.e., a sealed container partially filled with approximately 500 mL acetone.

The remainder of the procedure for solvent exchange and drying was carried out as described in Example 1.

The resulting aerogel was a yellow monolith with a bulk density of 0.111 g/cc and thermal conductivity of 24 mW/m-K.

Example 3. Synthesis of a Polyimide Aerogel Produced from Reaction of an Amine and an Anhydride and a Triamine Crosslinker Prepared Via Supercritical $CO_2$ Drying A polyimide gel was synthesized by reaction of an amine and an anhydride. A crosslinking solution was prepared in advance by adding 0.04 g Melamine and 0.28 g BPDA to 25 g NMP and stirring for 24 hours. After 24 hours of stirring, 0.19 g of DMBZ was added to this crosslinking mixture and stirred for 20 minutes. The crosslinking solution was then stored in a sealed container. 0.92 g 2,2'-dimethylbenzidine (DMBZ) is dissolved in 59.29 g N-methyl-2-pyrrolidone (NMP). After 10 minutes of stirring, 2.56 g of biphenyl-3,3',4,4'-tetracarboxylic dianhydride (BPDA) was added to this mixture and stirred for 10 minutes. After 10 minutes of stirring, 2.99 g of 4,4[1,3-phenylenebis(1-methyl-ethylidene)]bisaniline (bisaniline-m) was added to this mixture and stirred for 10 minutes. After 10 minutes of stirring, 2.56 g of BPDA was added to this mixture, and stirred for 10 minutes. After 10 minutes of stirring, 0.78 g of 4,4'-oxydianiline (ODA) was added to this mixture and stirred for 10 minutes. After 10 minutes, the crosslinking solution prepared in advance was added to the first mixture and stirred for 10 minutes. After 10 minutes of stirring, 14.22 g acetic anhydride and 3.52 g triethylamine were added in rapid succession. The resulting sol was stirred for 2-5 minutes until well mixed, then poured into a mold. The mold was then closed and placed in an air-tight container and left for 24 hours at room temperature. After 24 hours the gel was removed from its mold and transferred to a solvent exchange bath i.e., a sealed container partially filled with approximately 500 mL acetone.

The remainder of the procedure for solvent exchange and drying was carried out as described in Example 1.

The resulting aerogel was a yellow monolith with a bulk density of 0.113 g/cc. and thermal conductivity of 24.8 mW/m-K. It had a specific surface area of 346 $m^2/g$.

Example 4. Synthesis of a Polyimide Aerogel Produced from Reaction of an Amine and an Anhydride and a Triisocyanate Crosslinker Prepared Via Supercritical $CO_2$ Drying A polyimide gel was synthesized by reaction of an amine and an anhydride. 1.14 g 2,2'-dimethylbenzidine (DMBZ) is dissolved in 71.96 g N-methyl-2-pyrrolidone (NMP). After 10 minutes of stirring, 3.16 g of biphenyl-3,3',4,4'-tetracarboxylic dianhydride (BPDA) was added to this mixture and stirred for 10 minutes. After 10 minutes of stirring, 3.70 g of 4,4'-[1,3-phenylenebis(1-methyl-ethylidene)]bisaniline (bisaniline-m) was added to this mixture and stirred for 10 minutes. After 10 minutes of stirring, another 3.16 g of BPDA was added to this mixture and stirred for 10 minutes. After 10 minutes of stirring, 0.97 g of 4,4'-oxydianiline (ODA) was added to this mixture and stirred for 10 minutes. After 10 minutes, a mixture of 0.18 g Desmodur N3300A and 8.00 g NMP was added to the first mixture and stirred for 10 minutes. After 10 minutes of stirring 17.55 g acetic anhydride and 4.35 g triethylamine were added in rapid succession. The resulting sol was stirred for 2-5 minutes until well mixed, then poured into a mold. The mold was then closed and placed in an air-tight container and left for 24 hours at room temperature. After 24 hours the gel was removed from its mold and transferred to a solvent exchange bath i.e., a sealed container partially filled with approximately 500 mL acetone.

The remainder of the procedure for solvent exchange and drying was carried out as described in Example 1.

The resulting aerogel was a yellow monolith with a bulk density of 0.123 g/cc and a thermal conductivity of 27.6 mW/m-K. It had a specific surface area of 367 $m^2$/g and an average pore diameter of 12.6 nm, as show in FIG. 6. It had a compressive modulus of 29.8 MPa compressive yield strength of 1.1 MPa. A plot of the stress vs. strain data is shown in FIG. 7.

Example 5. Synthesis of a Polyimide Aerogel Produced from Reaction of an Amine and an Anhydride and a Triamine Crosslinker Prepared Via Supercritical $CO_2$ Drying A polyimide gel was synthesized by reaction of an amine and an anhydride. 1.14 g 2,2'-dimethylbenzidine (DMBZ) is dissolved in 71.96 g N-methyl-2-pyrrolidone (NMP). After 10 minutes of stirring, 3.16 g of biphenyl-3,3',4,4'-tetracarboxylic dianhydride (BPDA) was added to this mixture and stirred for 10 minutes. After 10 minutes of stirring, 3.70 g of 4,4'-[1,3-phenylenebis(1-methyl-ethylidene)]bisaniline (bisaniline-m) was added to this mixture and stirred for 10 minutes. After 10 minutes of stirring, another 3.16 g of BPDA was added to this mixture and stirred for 10 minutes. After 10 minutes of stirring, 0.97 g of 4,4'-oxydianiline (ODA) was added to this mixture and stirred for 10 minutes. After 10 minutes, a mixture of 0.05 g Melamine and 8.00 g NMP was added to the first mixture and stirred for 10 minutes. After 10 minutes of stirring 17.55 g acetic anhydride and 4.35 g triethylamine were added in rapid succession. The resulting sol was stirred for 2-5 minutes until well mixed, then poured into a mold. The mold was then closed and placed in an air-tight container and left for 24 hours at room temperature. After 24 hours the gel was removed from its mold and transferred to a solvent exchange bath i.e., a sealed container partially filled with approximately 500 mL acetone.

The remainder of the procedure for solvent exchange and drying was carried out as described in Example 1.

The resulting aerogel was a yellow monolith with a bulk density of 0.131 g/cc and a thermal conductivity of 27.2 mW/m-K.

Example 6. Synthesis of a Polyimide Aerogel Produced from Reaction of an Amine and an Anhydride and a Triamine Crosslinker Prepared Via Supercritical $CO_2$ Drying A polyimide gel was synthesized by reaction of an amine and an anhydride. A crosslinking mixture was prepared in advance by adding 0.05 g Melamine and 0.33 g BPDA to 8 g NMP and stirring for 24 hours. After 24 hours of stirring, 0.24 g of DMBZ was added to this crosslinking mixture and stirred for 20 minutes. 1.14 g 2,2'-dimethylbenzidine (DMBZ) is dissolved in 71.96 g N-methyl-2-pyrrolidone (NMP). After 10 minutes of stirring, 3.16 g of biphenyl-3,3',4,4'-tetracarboxylic dianhydride (BPDA) was added to this mixture and stirred for 10 minutes. After 10 minutes of stirring, 3.70 g of 4,4'-[1,3-phenylenebis(1-methyl-ethylidene)]bisaniline (bisaniline-m) was added to this mixture and stirred for 10 minutes. After 10 minutes of stirring, another 3.16 g of BPDA was added to this mixture and stirred for 10 minutes. After 10 minutes of stirring, 0.97 g of 4,4'-oxydianiline (ODA) was added to this mixture and stirred for 10 minutes. After 10 minutes, the crosslinking solution prepared in advance was added to the first mixture and stirred for 10 minutes. After 10 minutes of stirring 17.55 g acetic anhydride and 4.35 g triethylamine were added in rapid succession. The resulting sol was stirred for 2-5 minutes until well mixed, then poured into a mold. The mold was then closed and placed in an air-tight container and left for 24 hours at room temperature. After 24 hours the gel was removed from its mold and transferred to a solvent exchange bath i.e., a sealed container partially filled with approximately 500 mL acetone.

The remainder of the procedure for solvent exchange and drying was carried out as described in Example 1.

The resulting aerogel was a yellow monolith with a bulk density of 0.137 g/cc and a thermal conductivity of 27.4 mW/m-K. It had a specific surface area of 331 $m^2$/g.

Example 7. Synthesis of a Polyimide Aerogel Produced from Reaction of an Amine and an Anhydride and a Triisocyanate Crosslinker Prepared Via Atmospheric-Pressure Freeze Drying from Organic Solvent with Dry Air A polyimide gel was synthesized using the procedure described in Example 1 up until the solvent exchange step. After aging, rather than transferring the gel to acetone, it was transferred to a bath of tert-butanol, i.e., tert-butyl alcohol. The volume of the alcohol bath was five times that of the gel. The alcohol in the bath was replaced 5 times, once every 24 hours. The bath was maintained at 40° C. throughout solvent exchange. After solvent exchange, the gel was placed in a sealed bag and transferred to a cold chamber maintained at 10° C. for 12 hours to freeze the solvent.

The gel was then removed from the bag and transferred to a temperature-controlled drying chamber. The gel was placed in the drying chamber on a scaffold that thermally isolated it from the walls of the chamber and allowed for unimpeded gas flow on all sides of the gel. Gas was supplied at one end of the chamber and exhausted at the opposite end causing gas to constantly flow over and around the gel.

Temperature of the inlet gas was measured inside the drying chamber by a thermocouple placed directly downstream from the inlet port.

The gas in this case was desiccated compressed air. Air was supplied by a compressor at 100 psi. The regulated gas flow rate was controlled using a needle valve and the resultant flow rate of 25 SCFH measured using a gas-flow rotameter. After passing through the rotameter, the gas flowed through a liquid-cooled finned heat exchanger. The heat exchanger was cooled using a recirculating chiller, which pumped a cooled mixture of water and ethylene glycol, and was operated at a temperature and flow rate sufficient to maintain a drying chamber temperature of 0° C. as measured by the thermocouple at the inlet of the drying chamber. The effluent gas from the drying chamber (a mixture of air and tert-butanol vapor) passed through a cold trap designed to capture tert-butanol vapor. The remaining air was then vented to the atmosphere through a standard air exhaust system.

Over the course of the drying process the gel was optionally periodically removed from the drying chamber and its mass was measured before quickly returning it to the drying chamber (before remaining tert-butanol within the gel could begin to melt). The mass of the drying gel was thus tracked over time and when this mass ceased to change from one measurement to the next, the resulting aerogel was considered to be completely dry.

The resulting aerogel was a yellow monolith with a bulk density of 0.199 g/cc and a thermal conductivity of 24.0 mW/m-K. It had a specific surface area of 279 $m^2$/g.

Example 8. Synthesis of a Polyimide Aerogel Produced from Reaction of an Amine and an Anhydride and a Triisocyanate Crosslinker Prepared Via Subcritical $CO_2$ Drying A polyimide gel was prepared as described in Example 1 until the step after the pressure vessel containing liquid $CO_2$ was isolated from the $CO_2$ tank. At that point, instead, the vessel was heated to 28° C. Pressure was regulated using the same manner as described in Example 2 but was limited to 1000 psi as to never exceed the critical point of $CO_2$. After dwelling at these conditions for three hours, the pressure vessel was depressurized isothermally so that the surface tension of the liquid phase was minimized, thereby reducing drying stress exerted on the solid skeleton of the porous gel. Once the vessel reached atmospheric pressure, it was allowed to return to room temperature before the final polyimide/felt composite was retrieved.

The resulting aerogel was a yellow monolith with a bulk density of 0.115 g/cc. The material had a compressive modulus of 8.02 MPa, compressive yield strength of 0.4 MPa, and thermal conductivity of 23.5 mW/m-K. It had a specific surface area of 380 $m^2$/g.

Example 9. Synthesis of a Polyimide Aerogel Produced from Reaction of an Amine and an Anhydride and a Triamine Crosslinker Prepared by Supercritical $CO_2$ Drying A polyimide gel was synthesized by reaction of an amine and an anhydride. 0.960 g 4,4'-oxydianiline (ODA) was dissolved in 83.78 g N-methyl-2-pyrrolidone (NMP). After 10 minutes of stirring, 2.17 g of biphenyl-3,3',4,4'-tetracarboxylic dianhydride (BPDA) was added to this mixture and stirred for 10 minutes. After 10 minutes of stirring, 1.02 g of 2,2'-dimethylbenzidine (DMBZ) was added to this mixture and stirred for 10 minutes. After 10 minutes of stirring, 2.17 g of BPDA was added to this mixture, and stirred for 10 minutes. After 10 minutes of stirring, 1.65 g of 4,4'-[1,3-phenylenebis(1-2methyl-ethylidene)]bisaniline (bisaniline-m) was added to this mixture and stirred for 10 minutes. After 10 minutes, a mixture of 0.10 g 1,3,5-triaminophenoxybenzene (TAB) and 9.31 g NMP was added to the first mixture and stirred for 10 minutes. After 10 minutes of stirring 12.04 g acetic anhydride and 2.98 g triethylamine were added in rapid succession. The resulting sol was stirred for 2-5 minutes until well mixed, then poured into a mold. The mold was then closed and placed in an air-tight container and left for 24 hours at room temperature. After 24 hours the gel was removed from its mold and transferred to a solvent exchange bath i.e., a sealed container partially filled with approximately 500 mL acetone. It remained submerged in acetone in the container for 72 hours, during which time the acetone was decanted and replaced with an equivalent volume of new acetone twice.

The remainder of the procedure for solvent exchange and drying was carried out as described in Example 1.

The resulting aerogel was a yellow monolith and had a bulk density of 0.082 g/cc. Based on the fabrication and testing of similar materials, it is expected that the aerogel had a thermal conductivity of around 24.6 mW/m-K and a specific surface area of around 560 $m^2$/g. The material was very mechanically fragile and cracked significantly during processing and handling.

Example 10. Synthesis of a Polyimide Aerogel Produced from Reaction of an Amine and an Anhydride and a Triamine Crosslinker Prepared Via Supercritical $CO_2$ Drying A polyimide gel was synthesized by reaction of an amine and an anhydride. 0.93 g 2,2'-dimethylbenzidine (DMBZ) is dissolved in 75.82 g N-methyl-2-pyrrolidone (NMP). After 10 minutes of stirring, 2.57 g of biphenyl-3,3',4,4'-tetracarboxylic dianhydride (BPDA) was added to this mixture and stirred for 10 minutes. After 10 minutes of stirring, 3.01 g of 4,4'-[1,3-phenylenebis(1-methyl-ethylidene)]bisaniline (bisaniline-m) was added to this mixture and stirred for 10 minutes. After 10 minutes of stirring, another 2.57 g of BPDA was added to this mixture and stirred for 10 minutes. After 10 minutes of stirring, 0.79 g of 4,4'-oxydianiline (ODA) was added to this mixture and stirred for 10 minutes. After 10 minutes, a mixture of 0.12 g 1,3,5-triaminophenoxybenzene (TAB) and 8.42 g NMP was added to the first mixture and stirred for 10 minutes. After 10 minutes of stirring 14.26 g acetic anhydride and 3.53 g triethylamine were added in rapid succession. The resulting sol was stirred for 2-5 minutes until well mixed, then poured into a mold. The mold was then closed and placed in an air-tight container and left for 24 hours at room temperature. After 24 hours the gel was removed from its mold and transferred to a solvent exchange bath i.e., a sealed container partially filled with approximately 500 mL acetone.

The remainder of the procedure for solvent exchange and drying was carried out as described in Example 1.

The resulting aerogel was a yellow monolith with a bulk density of 0.123 g/cc and a thermal conductivity of 27.6 mW/m-K. The structure of the aerogel is show in the SEM micrograph in FIG. 5. Liquid water droplets applied to the outer surface of the aerogel beaded up on the surface as shown in FIG. 4, indicating that the material was hydrophobic. The contact angle of the water droplets was 102°.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to.

Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An aerogel comprising the following moiety [M1]:

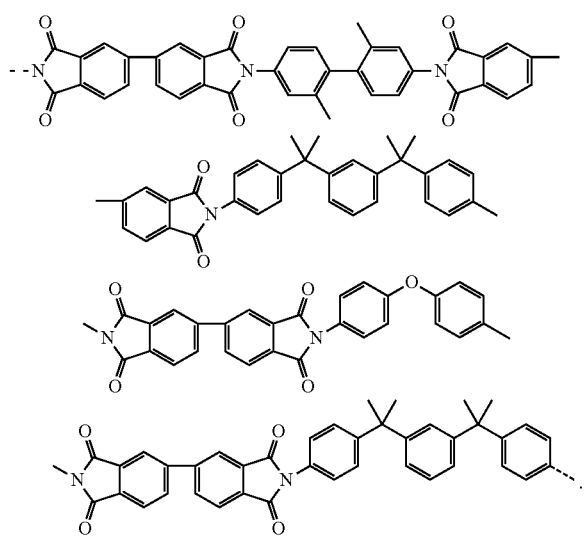

2. The aerogel of claim 1, wherein the moiety [M1] is part of a polymeric structure comprising repeating units of the moiety [M1].

3. The aerogel of claim 2, wherein the polymeric structure comprises at least 5 repeating units of the moiety [M1].

4. The aerogel of claim 1, wherein the aerogel comprises from 2 to 20 repeating units of the moiety [M1].

5. The aerogel of claim 1, wherein at least 90 wt % of the aerogel is made up of moiety [M1].

6. The aerogel of claim 1, wherein the aerogel comprises a polyimide aerogel.

7. The aerogel of claim 1, wherein, when the aerogel is submerged under water at 25° C. for 24 h, the aerogel uptakes a mass of water within its outer boundaries of less than 60% of the dry mass of the aerogel prior to submerging in the water.

8. The aerogel of claim 1, wherein, when the aerogel is submerged under water at 25° C. for 24 h, the aerogel uptakes a mass of water within its outer boundaries of less than 40% of the dry mass of the aerogel prior to submerging in the water.

9. The aerogel of claim 1, wherein, when the aerogel is submerged under water at 25° C. for 24 h, the aerogel uptakes a mass of water within its outer boundaries of less than 20% of the dry mass of the aerogel prior to submerging in the water.

10. The aerogel of claim 1, wherein, when the aerogel is exposed to water vapor, the aerogel uptakes a mass of water within its outer boundaries of less than 20% of the dry mass of the aerogel prior to exposure to the water vapor.

11. The aerogel of claim 1, wherein the aerogel exhibits a contact angle with water, in an ambient air environment at 1 atm and 25° C., of greater than 90°.

12. The aerogel of claim 1, wherein the aerogel exhibits a BET surface area of greater than 200 $m^2/g$.

13. The aerogel of claim 1, wherein the aerogel exhibits a bulk density of between 0.06 to 0.2 $g/cm^3$.

14. The aerogel of claim 1, wherein the aerogel comprises silica aerogel and polyimide aerogel.

15. The aerogel of claim 1, wherein the aerogel exhibits a compressive modulus of greater than 1 MPa.

16. The aerogel of claim 1, wherein the aerogel exhibits a compressive yield strength of greater than 300 kPa.

17. The aerogel of claim 1, wherein the aerogel exhibits a flexural modulus of greater than 1 MPa.

18. The aerogel of claim 1, wherein the aerogel exhibits a flexural yield strength of greater than 500 kPa.

19. The aerogel of claim 1, wherein the aerogel exhibits an average dielectric constant over the range of 0-50 GHz of less than 1.4.

20. The aerogel of claim 1, wherein the aerogel exhibits an average loss tangent over the range of 0-50 GHz of less than 0.010.

21. The aerogel of claim 1, wherein the aerogel has at least one dimension between 10 microns and 1 mm.

22. The aerogel of claim 1, wherein the aerogel has at least one dimension equal to or greater than 30 cm.

23. The aerogel of claim 1, wherein the aerogel exhibits an average sound transmission loss over the frequency range of 300 Hz-2000 Hz greater than 5 dB/cm.

24. The aerogel of claim 1, wherein the average pore size of the aerogel is less than 20 nm.

25. The aerogel of claim 1, wherein the aerogel comprises pores of 1 micron or greater.

26. The aerogel of claim 1, wherein the aerogel comprises a bimodal pore size distribution.

27. The aerogel of claim 1, wherein the aerogel exhibits a thermal conductivity of less than 30 mW/m-K at 25° C.

28. The aerogel of claim 1, wherein the aerogel is substantially free of fluorine.

29. The aerogel of claim 1, wherein the aerogel meets the criteria for Class A1, Class A2, and/or Class B fire behavior of the European classification standard EN 13501-1.

30. The aerogel of claim 1, wherein the aerogel meets the criteria for flame time, drip flame time, and/or burn length set forth in Part 25.853a of the United States Federal Aviation Regulations.

31. The aerogel of claim 1, wherein the aerogel meets the criteria for total heat release within the first two minutes, peak heat release rate, and/or 4.0-minute smoke density set forth in Part 25.853d of the United States Federal Aviation Regulations.

32. The aerogel of claim 1, wherein the aerogel is non-flammable.

33. The aerogel of claim 1, wherein the aerogel has a maximum operating temperature of greater than about 100° C.

34. An aircraft wall panel comprising the aerogel of claim 1.

35. An engine cover comprising the aerogel of claim 1.

36. A ballistics armor, shield, panel, composite, and/or protective vest comprising the aerogel of claim 1.

37. A shoe, boot, or insole comprising the aerogel of claim 1.

38. A flexible tape comprising the aerogel of claim 1.

39. A thin film comprising the aerogel of claim 1.

40. A monolith comprising the aerogel of claim 1.

41. A carbonized derivative of the aerogel of claim 1.

* * * * *